US009891780B2

(12) United States Patent
Adimatyam et al.

(10) Patent No.: US 9,891,780 B2
(45) Date of Patent: Feb. 13, 2018

(54) USER-BASED CUSTOMIZATION OF A USER INTERFACE

(71) Applicant: Verizon Patent and Licensing Inc., Basking Ridge, NJ (US)

(72) Inventors: Venkata S. Adimatyam, Irving, TX (US); Sameer Gavade, Irving, TX (US); Tariq Roshan, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 390 days.

(21) Appl. No.: 14/015,246

(22) Filed: Aug. 30, 2013

(65) Prior Publication Data

US 2015/0067531 A1    Mar. 5, 2015

(51) Int. Cl.
*G06F 3/0484* (2013.01)
*G06F 3/0481* (2013.01)
*H04N 5/445* (2011.01)
*G06Q 30/06* (2012.01)

(52) U.S. Cl.
CPC ....... *G06F 3/0481* (2013.01); *G06Q 30/0621* (2013.01); *H04N 5/44543* (2013.01)

(58) Field of Classification Search
CPC .... G06F 17/30867; G06F 21/10; G06F 3/048; G06F 3/0482; G06F 3/0484; G06F 17/30; G06F 3/0481; G06F 3/04812; G06F 30/00; H04N 21/47; H04N 5/44543
See application file for complete search history.

(56) References Cited

U.S. PATENT DOCUMENTS

| | | | | |
|---|---|---|---|---|
| 5,898,434 A | * | 4/1999 | Small | G06F 3/0481 715/810 |
| 2002/0053084 A1 | * | 5/2002 | Escobar | H04N 7/17318 725/47 |
| 2006/0048060 A1 | * | 3/2006 | Mohr | G06F 9/4443 715/747 |
| 2007/0055936 A1 | * | 3/2007 | Dhanjal | G06F 17/227 715/700 |
| 2009/0133059 A1 | * | 5/2009 | Gibbs | G06F 17/30038 725/34 |
| 2009/0150814 A1 | * | 6/2009 | Eyer | G06F 3/04842 715/765 |
| 2011/0154216 A1 | * | 6/2011 | Aritsuka | G06F 9/4443 715/745 |
| 2011/0191699 A1 | * | 8/2011 | Cunningham | G06F 9/4443 715/762 |
| 2012/0304229 A1 | * | 11/2012 | Choi | H04N 21/8173 725/41 |

* cited by examiner

*Primary Examiner* — Amy Ng
*Assistant Examiner* — Tan Tran

(57) ABSTRACT

A customized user interface service includes a self-customization and an auto-customization of user interfaces. A user interface is customized based on usage data of the user. The usage data includes historical navigational data. The usage data is analyzed to identify a pattern of usage. The user interface is customized based on the identified pattern of usage. The customized user interface service also allows a user to select and execute customizations.

20 Claims, 18 Drawing Sheets

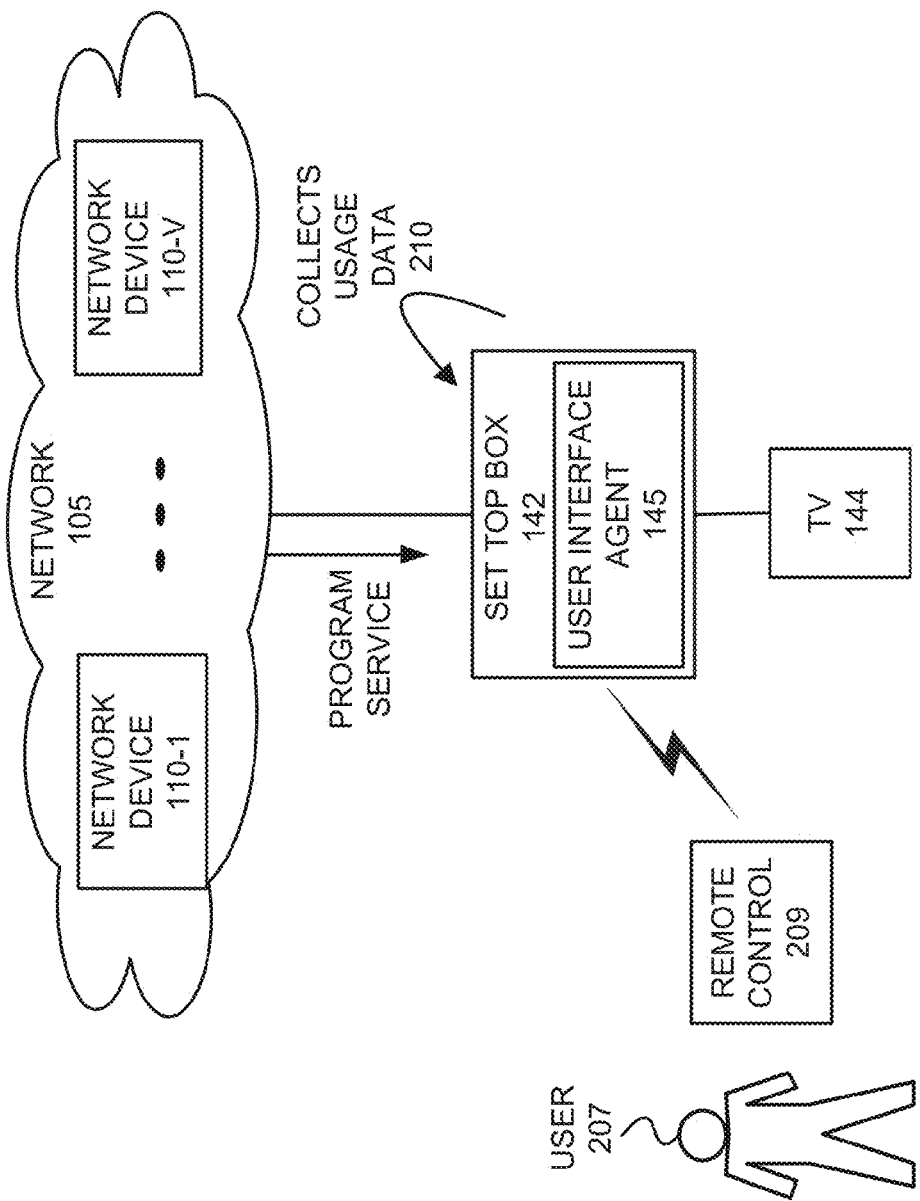

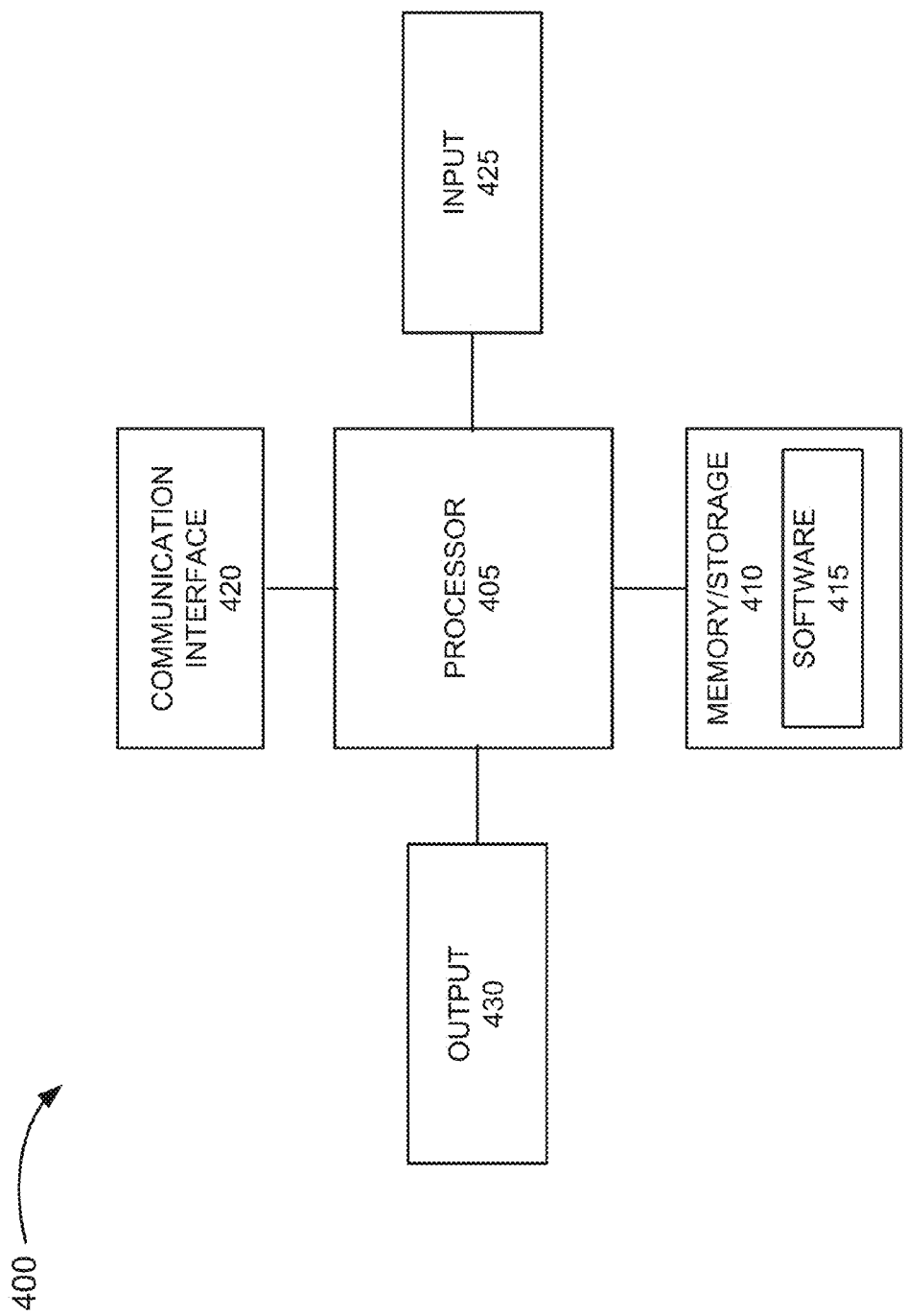

USER-BASED CUSTOMIZATION OF A USER INTERFACE

BACKGROUND

Users are provided with various user interfaces to navigate through in order to access a particular interactive element. For example, users may have to navigate through layers of user interfaces of a television service to ultimately reach a particular interactive element to invoke a particular function or service.

BRIEF DESCRIPTION OF THE DRAWINGS

FIGS. 2A-2D are diagrams illustrating exemplary processes pertaining to the customized user interface service;

FIG. 4 is a diagram illustrating exemplary components of a device in the environments described herein;

DETAILED DESCRIPTION OF PREFERRED EMBODIMENTS

Figure 1A:
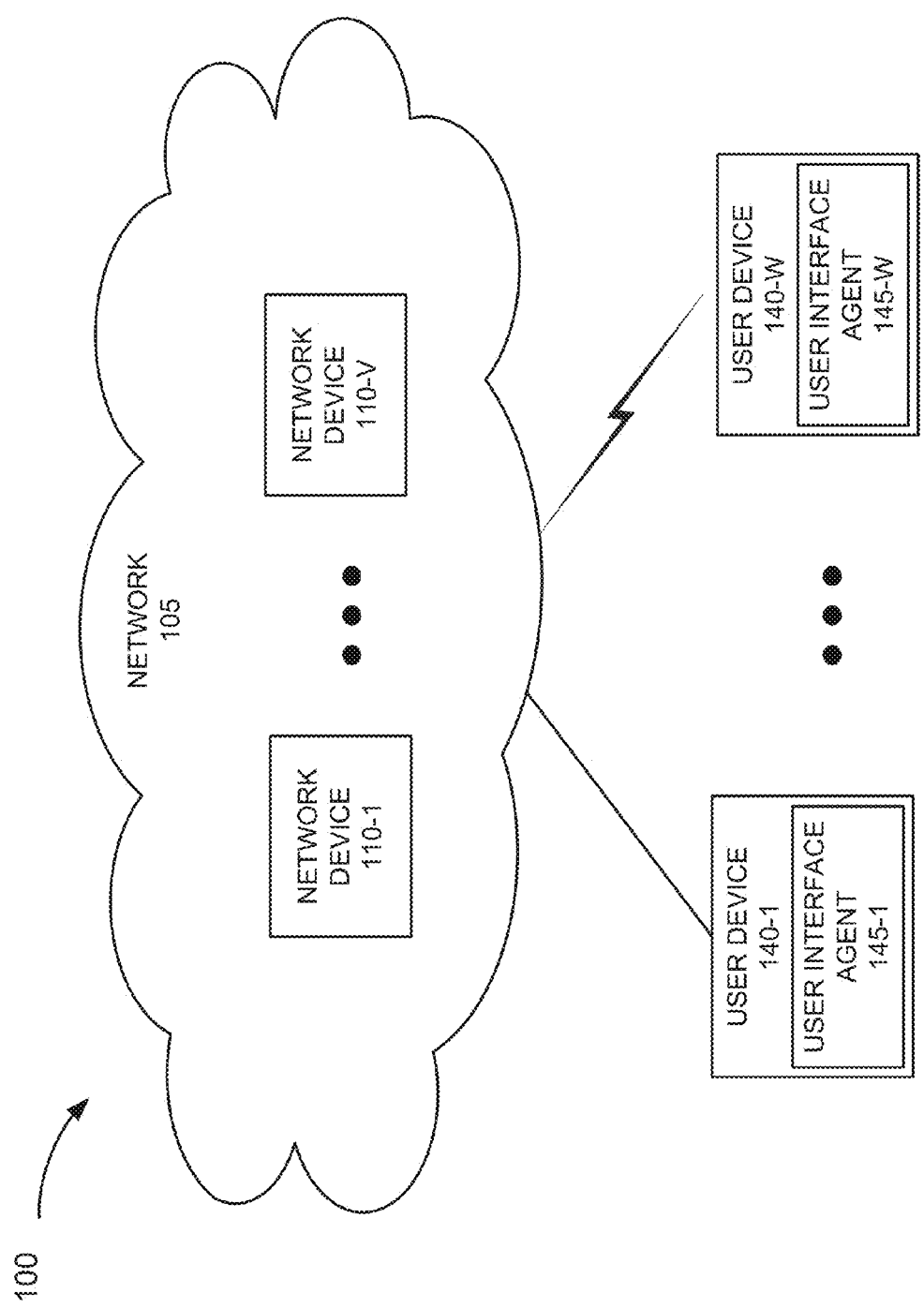
FIG. 1A is a diagram illustrating an exemplary environment in which an exemplary embodiment of a customized user interface service may be implemented.

The following detailed description refers to the accompanying drawings. The same reference numbers in different drawings may identify the same or similar elements. Also, the following detailed description does not limit the invention.

Users are confronted with the task of navigating through various user interfaces to ultimately reach a particular portion of a user interface. In some cases, a user interface includes selectable objects, menus, or other interactive elements that are rarely, if ever used by a user. One approach to reduce the labor for a user in navigating to an interactive element is to record a macro-type navigation. For example, the user may record a series of navigations that the user frequently uses, as a macro, and assign the recorded macro to a button or other user interface element. In this way, the user can invoke the macro and automate the navigation or other operation that has been recorded. However, such an approach requires the user to record the macro, remember which button or other instance that invokes which macro, etc.

According to exemplary embodiments, methods, systems, devices, and non-transitory storage media having instructions stored thereon provide a customized user interface service. According to an exemplary embodiment, the customized user interface service is provided via a program service. The customized user interface service includes an auto-customized user interface service. For example, as described further below, the auto-customized user interface service customizes a user interface based on various types of data including navigational data, viewing data, user preference data, and/or business rules.

The customized user interface includes a self-customized user interface service. For example, the user may configure the graphical layout of a user interface by invoking various customization functions, such as remove, move, resize, reshape, assign a color, rename, etc. According to an exemplary embodiment, the auto-customized user interface service may be used in combination with the self-customized user interface service. For example, the automatic-customized user interface service may generate a customized user interface and the user may further edit the customized user interface via the self-customized user interface service. Additionally, the customized user interface service allows the user to assign a graphical user interface, a function, or a service to an input (e.g., a button of a remote control device, etc.).

According to an exemplary embodiment, a user device stores a user profile pertaining to a user of the user device. For example, the user profile includes usage data pertaining to the user's usage of a program service. For example, the usage data includes historical navigational data and historical viewing data (e.g., indicating programs viewed by the user). The navigational data is reflective of the user's navigational habits via user interfaces provided by the program service and may identify a series of user interface elements activated by the user. The user profile may include user preference data, as described further below. Additionally, the user profile may include personal information relating to the user (e.g., age, gender, profession, demographics, etc.).

According to an exemplary embodiment, the user device generates a new user interface based on the usage data. For example, assume that a user habitually navigates through a menu and a sub-menu included in a user interface. By way of further example, the user habitually navigates from a main menu through various sub-menus to reach a particular interactive graphical element included in a target sub-menu. According to such a use case, the user device generates a new user interface in which the interactive graphical element resides in a new position within the user interface. For example, the main menu may now include the interactive graphical element based on the historical navigational data. Alternatively, the interactive graphical element may be ordered differently in the target sub-menu or incorporated into an intermediary sub-menu.

According to an exemplary embodiment, the user device automatically generates a new interface based on other usage data. For example, assume the user device includes a set top box and the other user data pertains to programs viewed via the set top box. The programs may include programs accessed via pay-per-view, video-on-demand (VoD), and other television programming (e.g., Internet Protocol Television (IPTV), broadcasted, live, pre-recorded, etc.). According to an exemplary use case, the user device generates an electronic program guide (EPG) that lists channels and their associated programs in an order based on the viewing data. For example, the electronic program guide may list channels and their associated programs in an order reflective of programs in which the user would be most interested.

According to an exemplary embodiment, the user device automatically determines a layout of the new user interface and/or a modification of an existing user interface based on the navigational data and/or the viewing data. Additionally, the user device may use other types of data, such as user preference data and/or business rules. For example, user preference data may be stored with the user profile and may indicate certain user preferences pertaining to the customized user interface service. The business rules may include policies and procedures pertaining to the provisioning of the customized user interface service. For example, the user device may remove an interactive graphical element that is rarely, if ever used by the user. In this way, user interfaces are customized in accordance with the user's behavior and are dynamic. Additionally, the customized user interface service may be based on other parameters (e.g., day, time, etc.). For example, a user may have one version of a main menu during the day and another version of the main menu during the evening. Additionally, the user interface may be device-specific. For example, the user may use multiple user devices (e.g., a mobile device, a set top box and television, a desktop computer) during different times of a day, each of which may have different customized user interfaces. As previously described, the user device may use other data (e.g., personal data) to generate a customized user interface.

According to another exemplary embodiment, a network device automatically generates a new interface based on historical navigational data attributable to a user or multiple users. For example, assume the user device includes a set top box. A service provider may collect the historical navigational data pertaining to other users (e.g., a family's navigational history) or pertaining to a geographic region (e.g., a zip code, a city, a state, nationwide). The network device may generate a new user interface for the set top boxes based on an analysis of the historical navigational data.

According to an exemplary embodiment, a user device allows a user to customize a user interface. For example, the user of the user device may select an interactive graphical element and invoke various customization functions, such as remove, move, resize, reshape, assign a color, rename, etc. The user device allows the user to save the customized user interface. The user device subsequently may operate to present/display the customized user interface to the user. According to an exemplary embodiment, the user may invoke a customized user interface via an assigned input. For example, assume the user device includes a set top box. The user may assign a button of a remote control device to invoke one or multiple customized user interfaces. Alternatively, the user may assign a graphical element as an interactive gateway to one or multiple customized user interfaces.

The term "program," as used herein, includes audio and/or video. By way of example, a program may include a movie, a television show, or other type of audio and video content. Use of the term "program" in this description should also be interpreted based on context. The term "channel," as used herein, is intended to include a television channel or an Internet channel. For example, the channel may be a digital channel (e.g., over-the-air, cable, etc.), an on-line channel, or an Internet Protocol Television (IPTV) channel.

While exemplary embodiments described in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

FIG. 1A is a diagram illustrating an exemplary environment 100 in which an exemplary embodiment of user-based customization of a user interface may be implemented. As illustrated in FIG. 1A, exemplary environment 100 may include a network 105 that includes a network devices 110-1 through 110-V (also referred to as network devices 110 and generally as network device 110). Environment 100 also includes user devices 140-1 through 140-W (also referred to as user devices 140 and generally as user device 140) that respectively include user interface agents 145-1 through 145-W (also referred to as user interface agents 155 and generally as user interface agent 145).

Environment 100 may be implemented to include wired (e.g., cable, optical, etc.) and/or wireless connections (e.g., radio, etc.) among the devices and network illustrated. A connection may be direct or indirect and may involve intermediary device(s) and/or network(s) not illustrated in FIG. 1A. Additionally, the number and the arrangement of connections between user device 140 and network 105 are exemplary.

Network 105 includes one or multiple networks of one or multiple types. Network 105 may be implemented as a satellite network, a terrestrial network, or a combination thereof. For example, network 105 may include the Internet, a program delivery network, a wide area network, a private network, a public network, an intranet, a local area network, an access network, a packet-switched network, a wired network (e.g., an optical network, a cable network, etc.), a wireless network (e.g., a mobile network, a cellular network, a non-cellular network, etc.), a cloud network, a data network, a computer network, etc. Network 105 may operate according to various protocols, communication standards, platforms, etc.

Network devices 110 include network elements (e.g., logic, functions) that provide a program service. For example, the program service includes a program delivery service. For example, the program delivery service includes a program streaming service, a program download service, a program package service (e.g., a television package, which may include premium channels, etc.), or some combination thereof that provides program delivery. The program service also provides various user interfaces that allow users to select and view programs, manage settings, record programs, and access other services, such as for example via widgets, etc.

The program service also includes a customized user interface service. By way of example, a customized user interface may pertain to any user interface accessible via the program service, such as a main menu, a sub-menu, an electronic program guide (EPG), a video-on-demand (VoD) user interface, a pay-per-view user interface, a widget user interface, a digital video recorder interface, etc. A program service provider may offer the customized user interface service as a free service or a billable service. According to an exemplary embodiment, the customized user interface service includes the acquisition, storage, and usage of a view history record and/or navigational data of a user. The view history record and/or navigational data may be used to generate a customized user interface. In this regard, the program service provider typically obtains appropriate permissions from the user before providing such a service. For example, the program service provider may offer the customized user interface service to a user as an "opt-in" or an "opt-out" service. The customized user interface service may also store and use user preference data and business rules.

Network devices 110 may be implemented to include, for example, a cloud device, an application server device, a web server device, a media device, or some combination thereof, as well as, for example, a program storage device, a user interface storage device, a security device, a router, a load balancer, a billing device, etc. At least one network device 110 may be implemented as a computational device that generates customized user interfaces, as described herein.

User device 140 includes an end device. For example, user device 140 may be implemented as a mobile device (e.g., a smartphone, a tablet, a netbook, etc.), a computer (e.g., a desktop computer, a laptop computer, etc.), a television (e.g., a smart television, etc.), a set top box, a Web browsing device, a communication system in a vehicle, or some combination thereof.

User interface agent 145 includes software that generates a customized user interface. User interface agent 145 may generate a customized user interface based on navigational data, viewing data, and/or other types of data (e.g., user preferences, business rules, etc.). User interface agent 145 also may generate a customized user interface based on user-invoked customization commands. User interface agent 145 is described further below.

A device (e.g., user device 140, network device 110) may be implemented according to one or multiple network architectures (e.g., a client device, a server device, a peer device, a proxy device, or some combination thereof). A device, as described herein, may be implemented according to a centralized computing architecture, a distributed computing architecture, or a cloud computing architecture.

According to other embodiments, a single device may be implemented as multiple devices and/or multiple devices may be implemented as a single device. Also, according to other embodiments, one or more functions and/or processes described as being performed by a particular device may be performed by a different device, or some combination of devices, which may or may not include the particular device.

The number of devices and configuration in environment 100 is exemplary and provided for simplicity. According to other embodiments, environment 100 may include additional devices, fewer devices, different devices, and/or differently arranged devices than those illustrated in FIG. 1A.

Figure 1B:
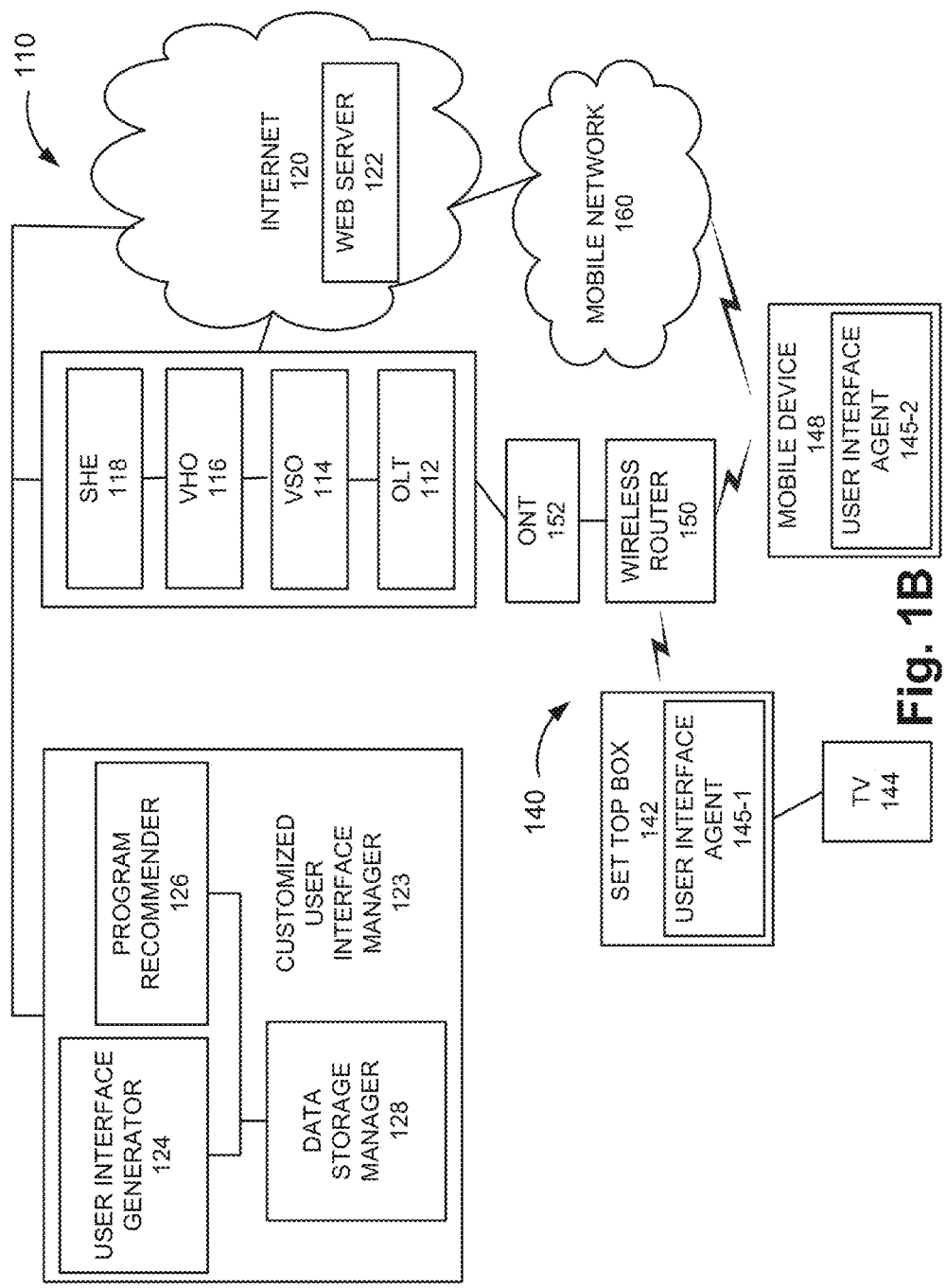
FIG. 1B is a diagram illustrating exemplary network elements of network devices and exemplary end user elements of user devices depicted in FIG. 1A.

FIG. 1B is a diagram illustrating exemplary network elements of network devices 110 and exemplary end user elements of user devices 140. For example, a portion of network devices 110 is capable of delivering programs to users via user devices 140. For example, this portion of network devices 110 may be implemented to delivery programs using various technologies, such as an optical architecture, a coaxial cable architecture, an Internet Protocol (IP) TV architecture, a digital subscriber line (DSL) architecture, or some combination thereof. Depending on the architecture implemented, this portion of network devices 110 may include various types of program distribution devices, program storing devices, and other types of device that contribute to the access and delivery of programs. For purposes of description, assume that the program delivery network is implemented to include an optical network. According to such an implementation, network devices 110 include an optical line termination (OLT) 112, a video serving office (VSO) 114, a video headend office (VHO) 116, and a super headend (SHE) 118. By way of example, OLT 112 serves as the program service provider's endpoint. OLT 112 may provide downstream and upstream frame processing, etc. VSO 114 distributes programs to user locations 150 via access networks. VHO 116 includes network elements that ingest programs on a regional and a local level. VHO 116 may also provide on-demand services, etc. SHE 118 includes network elements that ingest programs on a national level. SHE 117 may aggregate, process, encode, and distribute programs to VHO 116.

VHO 116, VSO 114, and/or SHE 118 also include storage devices that store user interfaces (e.g., interactive programming guides (IPGs), main menu, sub-menus, etc.) and programs pertaining to the program service. Network devices 110 may also include network elements not specifically illustrated, such as switches, amplifiers, add/drop multiplexers, other types of intermediary network elements, etc. For example, VSO 114 may include gateway routers (GWRs), etc.

Network elements of the program delivery network may also include a web server 122. For example, web server 122 may provide IPTV, downloading, and/or streaming of programs to users. Web server 122 may reside in Internet 120. Additionally, the program delivery network may also include network elements of a mobile network 160. For example, although not illustrated, the network elements may include enhanced Node Bs (eNBs), serving gateways (SGWs), etc., of a Long Term Evolution (LTE) network. Additionally, or alternatively, mobile network 160 may include network elements of another wireless communication standard.

As previously described, according to an exemplary embodiment, the program service includes a customized user interface service. The customized user interface service may include an auto-customized user interface service, a self-customized user interface service, or both. For example, a portion of network devices 110 include network elements that generate customized user interfaces according the customized user interface service. By way of example, the network elements include a customized user interface manager 123. As illustrated, customized user interface manager 123 includes a user interface generator 124, a program recommender 126, and a data storage manager 128.

User interface generator 124 generates customized user interfaces for users of the program service. According to an exemplary embodiment, user interface generator 124 generates customized user interfaces according to an auto-customized user interface service. For example, user interface generator 124 generates customized user interfaces based on usage data (e.g., navigational data, viewing data of programs), business rules, and/or user preference data. User interface generator 124 may also use personal data (e.g., age, gender, profession, financial, resident address, etc.).

The navigational data indicates the navigational history of a user when using the program service. For example, the navigational data indicates the user inputs, the user interfaces, the interactive elements in the user interfaces, and the services, functions, etc., used by the user. The navigational data also includes a user identifier (e.g., a user device identifier, login data from the user, etc.). The navigational data may also include omission data. For example, the omission data indicates user interfaces, interactive elements in the user interfaces, services, functions, options, etc., not used by the user. For example, a network device (e.g., network device 110) or a user device (e.g., user device 140) may compare what is available to the user (e.g., via the user interfaces of the program service) to what is actually being used by the user. As a result of the comparison, omission data is generated that indicates a user interface, a function, a service, an interactive element, etc., not being used by the user. In this regard, a pattern of usage may be reflective of what the user uses as well as what the user does not use. The customized user interface service (e.g., the auto-customized user interface service) may customize a user interface not only based on the use of certain user interfaces, etc., but also non-use. For example, a function or a menu rarely, if ever used, may be deleted.

The viewing data indicates the programs viewed by the user. For example, the viewing data may include a program identifier, a date and a timestamp, and a user identifier. The viewing data may include metadata associated with the programs (e.g., title, genre, plot, actors, etc.) and/or scheduling data (e.g., day, time, channel number, etc.). The viewing data may be filtered to prevent momentary viewing of a program (e.g., due to channel surfing, etc.) from being stored.

User preference data indicates user preferences pertaining to the customized user interface service. For example, a user preference may indicate to set up multiple user interface customizations based on the day of the week. For example, a user may wish to have a Monday-Friday customization and a Saturday and Sunday (i.e., weekend) customization. Additionally, for example, a user preference may indicate parameters pertaining to a customized user interface, such as, color, size of font, style of font, and types of interactive elements (e.g., list, button, menu, icon, etc.). Also, for example, a user preference may indicate not to remove a particular function, service, user interface, graphical element, etc., regardless of usage data. For example, assume the user rarely uses a game service. However, the user may indicate via a user preference to not remove the user interfaces associated with the game service. Additionally, for example, a user preference may indicate a particular type of customization. For example, according to an exemplary embodiment, the customized user interface service may offer various categories of customizations. For example, the categories may include most-popular, geeky, professional, by age (e.g., young, senior, middle-aged), by locale (e.g., in the neighborhood, in the city, etc.), by user personality (e.g., serious, fun, etc.), or by service (e.g., pay-per-view, video-on-demand, etc.).

Business rules include business policies or procedures pertaining to the customized user interface service. For example, a business rule may indicate a minimum time period for collecting usage data before identifying a navigational pattern attributable to a user. For example, business rules may indicate that a user exhibits the same navigational behavior for a certain number of times (e.g., ten times, twenty times, etc.) and/or for a certain period of time (1 month, etc.) before generating a customized user interface based on this navigational behavior. Additionally, for example, a business rule may indicate a certain number of users to exhibit a particular navigational behavior before determining that a customized user interface, which corresponds to the navigational behavior, is generated. Additionally, a business rule may prevent certain functions, services, user interfaces from being removed. For example, assume the user interfaces of the program service include settings, help, and/or customer service user interfaces. The business rule may prevent these types of user interfaces from being removed and/or limit the customization of these types of user interfaces regardless of user preferences, usage data, etc. A business rule may also include certain restrictions regarding the re-naming of a graphical element (e.g., to prevent vulgarity, etc.). While these business rules are exemplary, a program service provider that offers the customized user interface service may formulate a variety of business rules that align with various policies and procedures of the service provider.

As described further below, user interface generator 124 includes logic to generate customized user interfaces, examples of which are described herein. According to one exemplary embodiment, as described further below, user interface generator 124 may use user interface templates or user interface shells to generate a customized user interface. User interface generator 124 generates a customized user interface based on the user interface templates, in combination with the usage data, business rules, and/or user preference data.

According to another exemplary embodiment, the customized user interface service includes a self-customized user interface service, which allows a user to create a customized user interface. For example, user interface generator 124 receives customization commands, which act upon a user interface displayed to the user via a user device, so as to create a user interface. For example, the user may invoke a delete command, a swap command, a resize command, an add command, a rename command, etc., as described herein. User interface generator 124 generates a new user interface in response to the user's customization commands. User interface generator 124 allows the user to save a created user interface and request that the created user interface be used via the program service. According to an exemplary embodiment, the self-customized user interface service may be implemented by user interface agent 145. The creation service is described further below in relation to user interface agent 145.

Program recommender 126 selects programs to recommend to users. For example, program recommender 126 may include analytics that identify programs that are likely to appeal to a user based on viewing data. Program recommender 126 may correlate the viewing data with other available programs. For example, program recommender 126 may obtain program guide information, currently available and up-coming pay-per-view programs, etc. Program recommender 126 provides program recommendations to user interface generator 124. User interface generator 124 may generate a customized user interface based on the program recommendations. For example, assume that program recommender identifies channels within an electronic program guide to recommend to the user. User interface generator 124 may generate a customized user interface of the electronic programming guide that reorders the channels according to the program/channel recommendations of program recommender 126.

Data storage manager 128 stores various types of data so as to provide the customized user interface service. For example, data storage manager 128 stores navigational data, user preference data, viewing data, and business rules. Data storage manager 128 may include a database management system (DBMS) that supports, among other things, a data model and a query language, and controls data access, data integrity, etc., relative to a database. According to an exemplary implementation, the database may be implemented as a relational database or a hierarchical database model. Data (e.g., navigational data, etc.) of a database may be stored in various types of data structures (e.g., files, records, objects, tables, etc.). The database may also store metadata. Data storage manager 128 may obtain the various types of data from various devices (e.g., user devices 140, network devices 110) and personnel (e.g., network administrators, users, etc.).

According to an exemplary embodiment, customized user interface manager 123 provides the customized user interface service based on the aggregation of usage data, etc., associated with numerous users. According to another embodiment, customized user interface 123 provides the customized user interface service on a per-user basis. According to an exemplary embodiment, customized user interface manager 123 may communicate with user interface agents 145-1 and 145-2 (also referred to collectively as user interface agents 145 or individually as user interface agent 145). For example, user interface agent 145 may collect usage data and user preferences from a user and provide this data to customized user interface manager 123. Customized user interface manager 123 may generate a customized user interface based on the received data and provide user interface agent 145 with the customized user interface. Alternatively, as described further below, user interface agent 145 may generate a customized user interface. Additionally, or alternatively, customized user interface manager 123 may provide customized user interfaces from which a user can select via user interface agent 145. By way of example, as previously described, customized user interface manager 123 may offer various categories of customizations (e.g., most-popular, geeky, professional, by age, by locale, by user personality, or by service (e.g., pay-per-view, video-on-demand, etc.).

Also illustrated in FIG. 1B are exemplary end user elements. For example, user device 140 may include a set top box 142 and a television (TV) 144. Set top box 154 may be implemented as a converter box, a television receiver, a tuner device, a digibox device, an Internet Protocol (IP) set top box, an IPTV set top box, and/or some other form of a set top box. Set top box 142 includes user interface agent 145-1. According to other embodiments, for example, end user elements may include a mobile device 148. Mobile device 148 may be implemented as a smartphone, a tablet, a netbook, a computer, or other suitable mobile or portable communicative device. Mobile device 148 includes user interface agent 145-2. User interface agents 145-1 and 145-2 may also be referred to individually or generally as user interface agent 145.

User interface agent 145 provides the customized user interface service. For example, user interface agent 145 may provide the auto-customized user interface service, the self-customized user interface service, or both. Regarding, the auto-customized user interface service, similar to that previously described with respect to customized user interface manager 12, user interface agent 145 may store and use various types of data (e.g., usage data, user preference data, and business rules) to provide the customized user interface service. For example, user interface agent 145 collects navigational data and viewing data associated with the user's use of set top box 142 or mobile device 148. User interface agent 145 also provides a user interface to allow the user to set user preferences. User interface agent 145 may identify the user. For example, the user may log in or may be set during an on-boarding process of the customized user interface service.

Regarding the self-customized user interface service, user interface agent 145 allows a user to create a customized user interface. According to an exemplary embodiment, user interface agent 145 provides user interfaces that allow the user to invoke customization commands. According to another exemplary embodiment, the user may invoke customization commands via a remote control device. For example, the user may invoke customization commands via a keypad, buttons, etc. In turn, user interface agent 145 receives the customization commands, executes the customization commands, and in turn, creates a user interface. By way of example, the user may invoke a delete command, a swap command, a resize command, an add command, a move command, rename command, etc., examples of which are described further below. The customization command may pertain to a user interface or an element of a user interface (e.g., a button of a user interface, text, or other type of sub-element). User interface agent 145 allows the user to name and store a created user interface. User interface agent 145 may replace a user interface (e.g., a pre-installed user interface, a previous version of a user interface, etc.) currently used via the program service with the created user interface.

According to an exemplary embodiment, user interface agent 145 includes a user interface management system that stores, retrieves, and uses the appropriate user interfaces when providing the program service. The user interface management system may also store inactive user interfaces (e.g., a pre-installed user interface, a previous version user interface, an incomplete, newly created user interface, etc.) so that a user may activate, re-activate, edit, etc., an inactive user interface. According to an exemplary embodiment, user interface agent 145 provides the customized user interface service based on template interfaces, which are described further below.

Also illustrated in FIG. 1B are exemplary intermediary devices between user device 140 and network devices 110, such as a wireless router 150 and an optical network terminal (ONT) 152. Wireless router 150 may be implemented as an in-home router device, a broadband router, or a wireless router. Optical network terminal (ONT) 152 may be implemented as a conventional or a well-known ONT that interfaces with the optical network previously described.

The number of network elements, end user elements, and the configuration illustrated in FIG. 1B are exemplary. According to other embodiments, network devices 110 may include additional network elements, fewer network elements, different network elements, and/or differently arranged network elements, than those illustrated in FIG. 1B. For example, network devices 110 may include network elements that provide other types of services or functions, such as Internet service, telephone service, or alternatively access to one or more of these various services or functions. The connections illustrated in FIG. 1B are exemplary.

As previously described, a shell or a template user interface may be used to customize a user interface. The customization may be based on the usage data (e.g., navigational data, viewing data), user preference data, business rules and/or customization commands obtained via the customized user interface service.

Figure 1C:
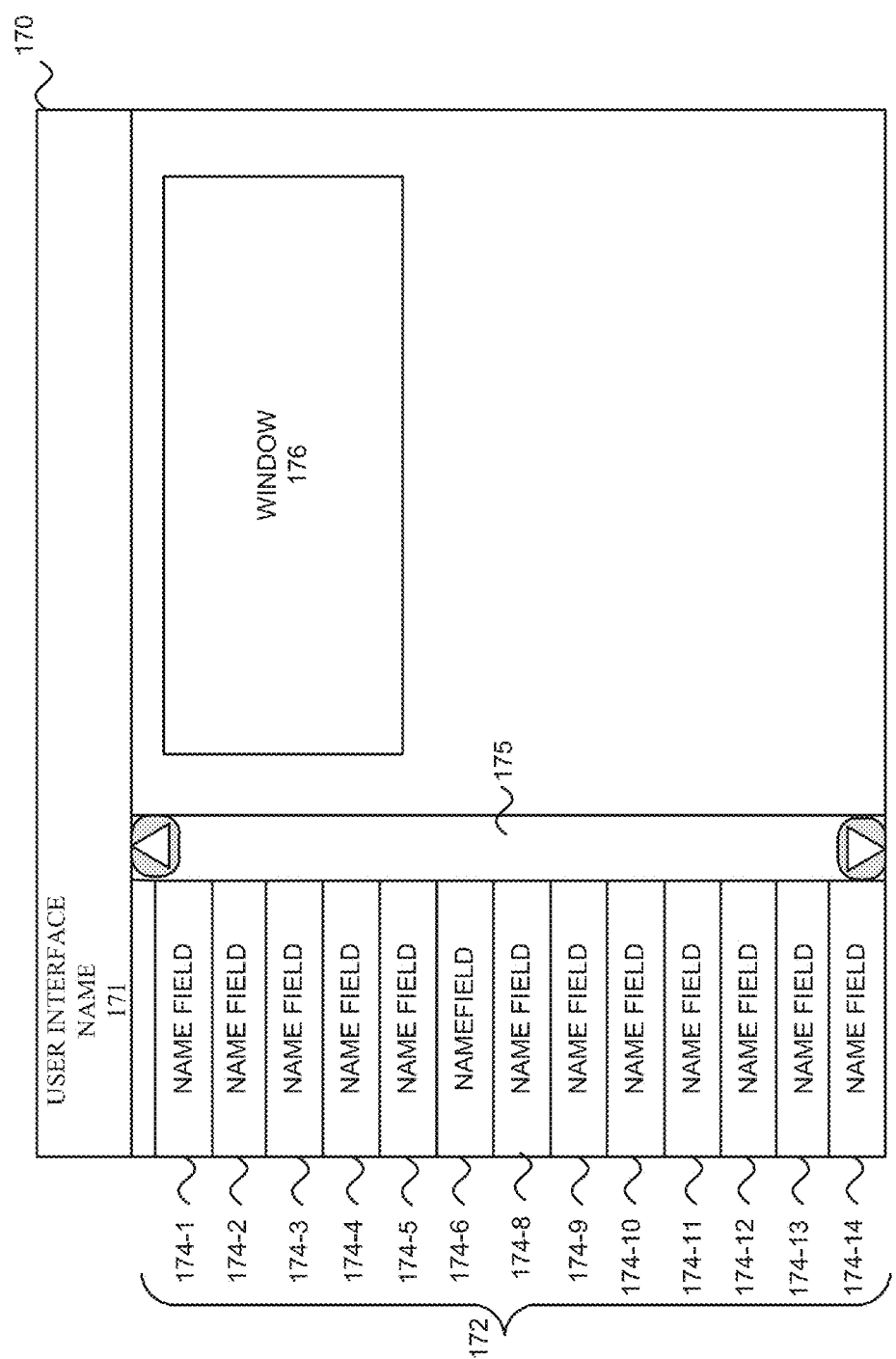
FIG. 1C is a diagram of an exemplary shell interface.
Figure 3A:
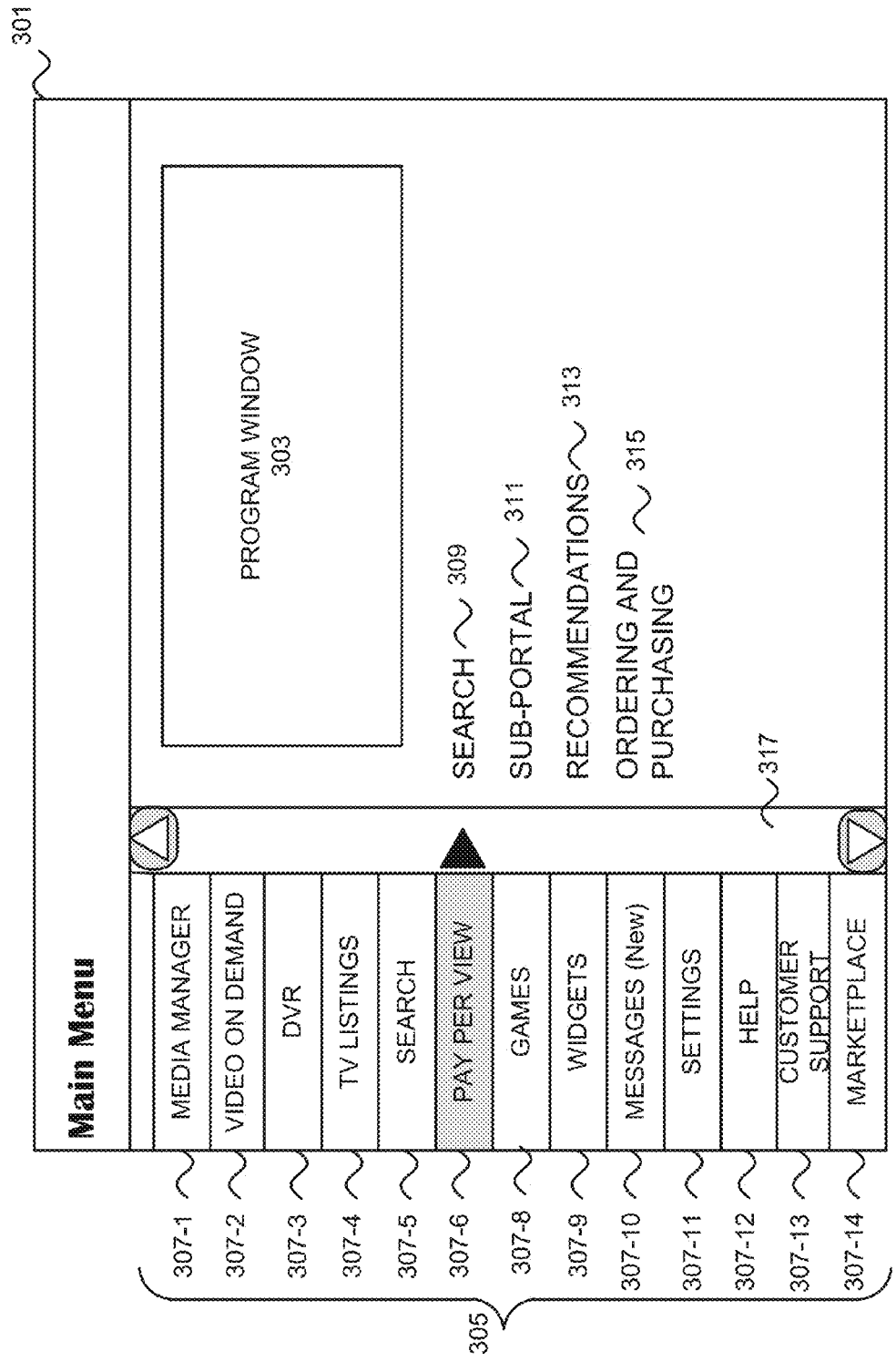
FIGS. 3A-3H are diagrams illustrating exemplary user interfaces pertaining to the customized user interface service.
Figure 3B:
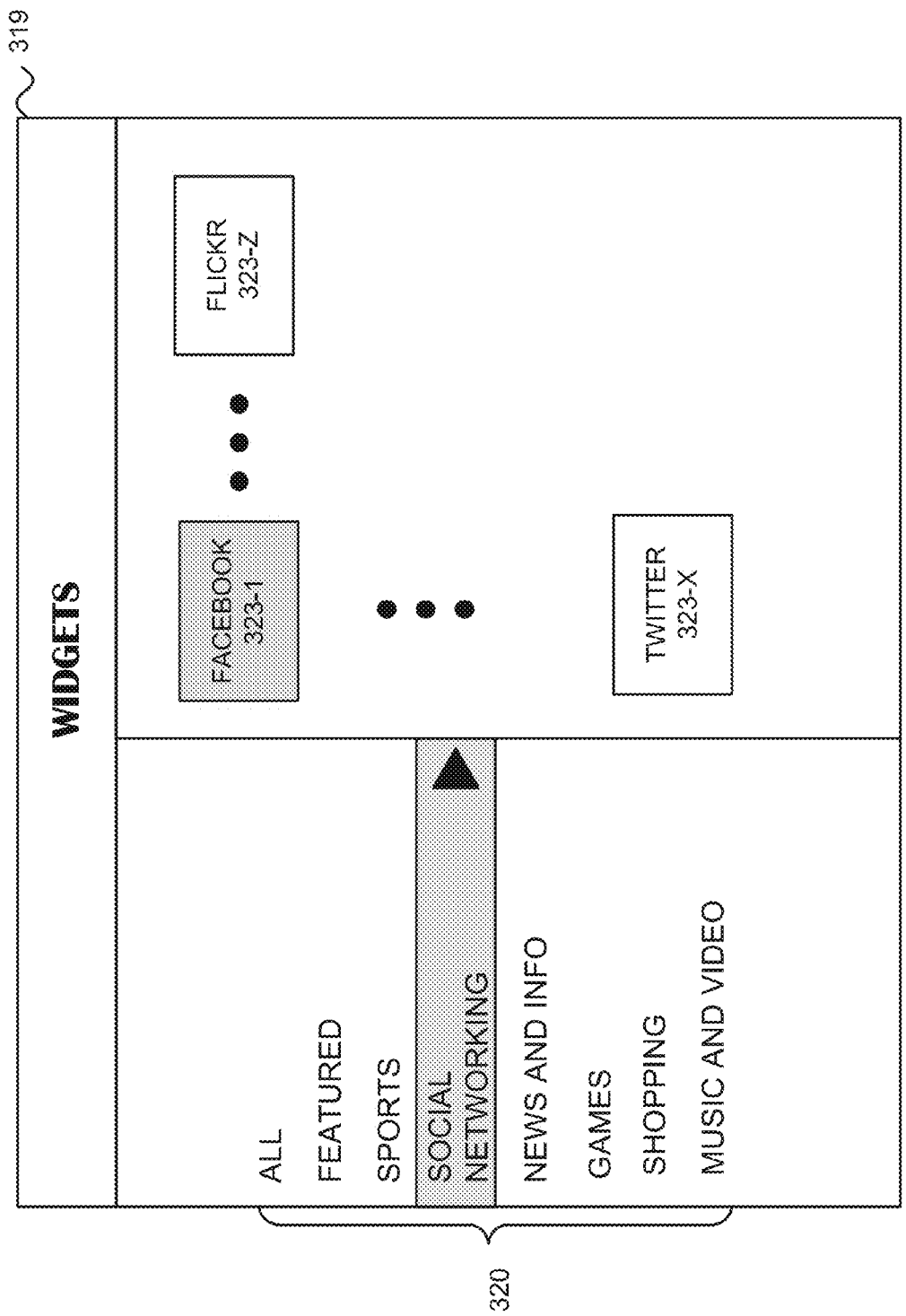

FIG. 1C is a diagram of an exemplary shell user interface. As illustrated, a shell user interface 170 includes a user interface name 171, a menu 172 that includes menu slots 174-1 through 174-14 (also referred to collectively as menu slots 174 and generally as menu slot 174), a scroll 175, and a window 176. According to other embodiments, shell user interface 170 may include another arrangement of shell elements (i.e., menu slots 174, etc.), different shell elements, additional shell elements, and/or fewer shell elements. According to an exemplary implementation, a user interface provided via the program service, may be based on a shell interface. For example, FIG. 3A is a diagram illustrating an exemplary user interface 301 that is based on shell interface 170. As illustrated, user interface name 171 includes text indicating the name of the user interface (e.g., "Main Menu"). A menu 305 corresponds to menu 172 of shell user interface 170. Additionally, menu slots 307-1 through 307-14 (also referred to collectively as menu slots 307 or generally as menu slot 307) correspond to menu slots 174. According to this example, menu slots 307 include interactive elements that provide access to various functions and services, such as media manager, video on demand, DVR, TV listings, search, pay per view, games, widgets, messages, settings, help, customer support, and marketplace. A user may access a sub-menu or a sub user interface via one of the menu slots 307. For example, as illustrated in FIG. 3A and indicated by the highlighting of menu slot 307-6 (named pay per view), a user may access a search element 309, a sub-portal element 311, a recommendations element 313, and an ordering and purchasing element 315. User interface 301 also includes a scroll bar 317 and a program window 303. Program window 303 may be a window within which a program may be displayed while the user accesses and uses menu 305. FIG. 3B is a diagram illustrating an exemplary sub-user interface 319. For example, the user may access user interface 319 via menu slot 307-9 (e.g., named widgets). As illustrated in FIG. 3B, user interface 319 includes, among other elements, a menu 320 that provides various elements (e.g., all, featured, sports, social networking, news and information, games, shopping, and music and video) to allow the user to select certain widgets. For example, assume the user selects "social networking" of menu 320, user interface 319 displays icons (e.g., Facebook 323-1, Twitter 323-X, Flickr 323-Z) (referred to collectively as icons 323 or generally as icon 323) that may be categorized as social networking widgets. The user may select and execute a widget via icon 323, an example of which is described further below.

Customized user interface manager 123, the user, and/or user interface agent 145 may customize a user interface based on a shell user interface (e.g., shell user interface 170), as described further below. As an example, in reference to the auto-customized user interface service, user interface agent 145 may change the order of menu slots 174. As another example, in reference to the self-customized user interface service, the user may change the name of a user interface (e.g., change the text of user interface name 171).

FIGS. 2A-2D are diagrams illustrating an exemplary process pertaining to the customized user interface service. For purposes of description, assume that user interfaces pertaining to a program service (e.g., a television service) are locally stored by set top box 142 (e.g., on a hard drive or other suitable storage medium). Also, assume that a user 207 subscribed to the customized user interface service. According to an exemplary use case, during an on-boarding process of the customized user interface service, set top box 142 obtains user interface agent 145 from network 105. Alternatively, according to another exemplary use case, set top box 142 may be pre-loaded with user interface agent 145.

Referring to FIG. 2A, assume user 207 operates set top box 142 via a remote control 209 to use a program service provided by network 105. For example, remote control 209 may be implemented as a universal television remote control or a mobile device (e.g., a smartphone, etc.). User 207's use of the program service includes viewing programs and use of/navigation through user interfaces pertaining to the program service. As illustrated, user interface agent 145 collects usage data 210 based on the user's use of the program service. Assume this process continues over a period of time, in which user 207 uses the program service via set top box 142 and user interface agent 145 collects usage data.

Figure 2B:
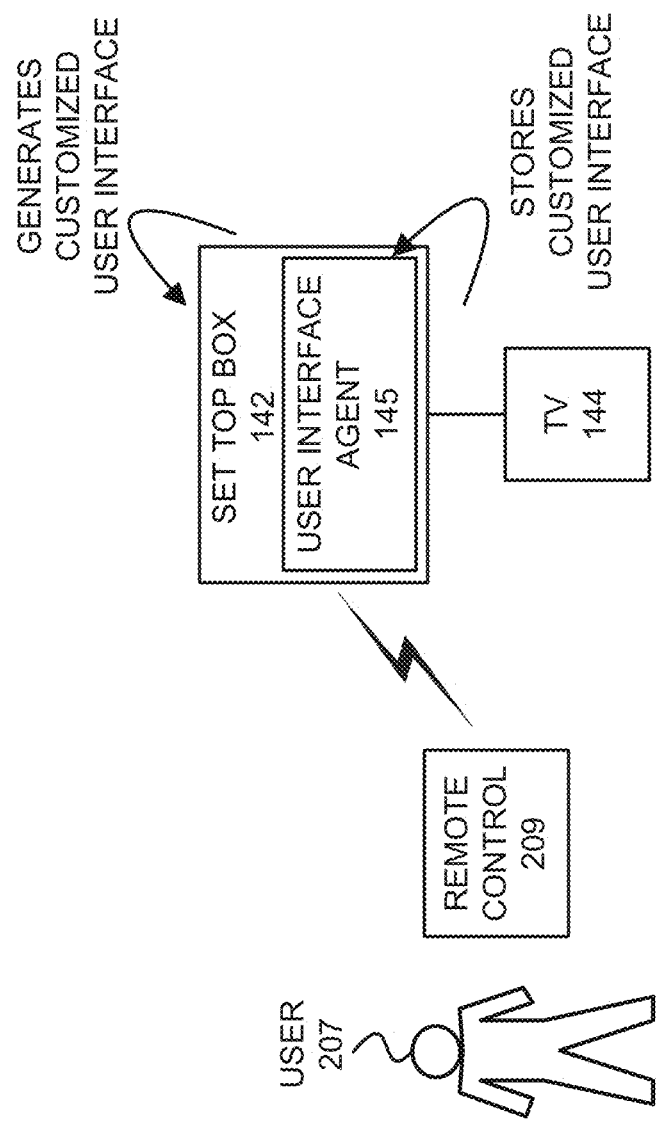
Figure 3C:
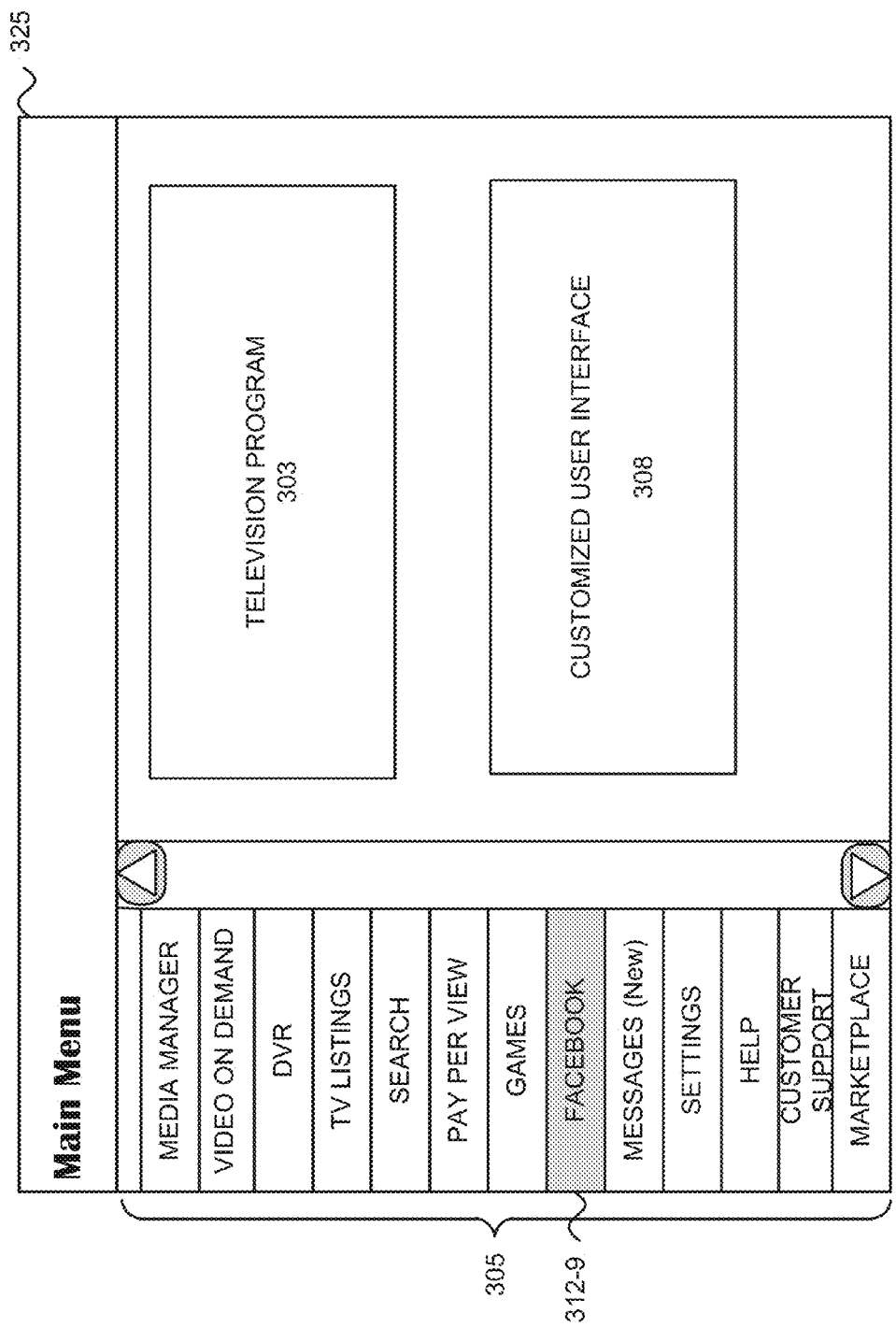

Referring to FIG. 2B, assume that a sufficient period of time has transpired and/or sufficient amount of usage data has been collected. For example, user interface agent 145 may identify when the navigational data indicates a pattern based on time and/or frequency specified in the business rules. In response to this identification, user interface agent 145 generates a customized user interface. By way of example, and referring to FIGS. 3A and 3B, assume user 207 habitually accessed menu slot 307-9 (named widgets) of user interface 301 (as illustrated in FIG. 3A) and executed the widget of Facebook 323-1. User interface agent 145 analyzes the navigational data and identifies a pattern of usage. For example, user interface agent 145 may use various algorithms (e.g., most-recently used (MRU), least-recently used (LRU), etc.) to identify a pattern of usage. In response thereto, user interface agent 145 generates a user interface 325, as illustrated in FIG. 3C. As illustrated, user interface agent 145 replaced menu slot 307-9 (named widgets) with menu slot 312-9 (named Facebook). In this way, the user may avoid having to navigate through various user interfaces, menus, etc., to access Facebook 323-1. According to an exemplary implementation, as a part of the auto-customized user interface service, user interface agent 145 may provide a customized user interface 308 (e.g., an overlay, etc.) that allows the user to accept the change to the user interface and authorize the use of user interface 325 in the program service.

Figure 3D:
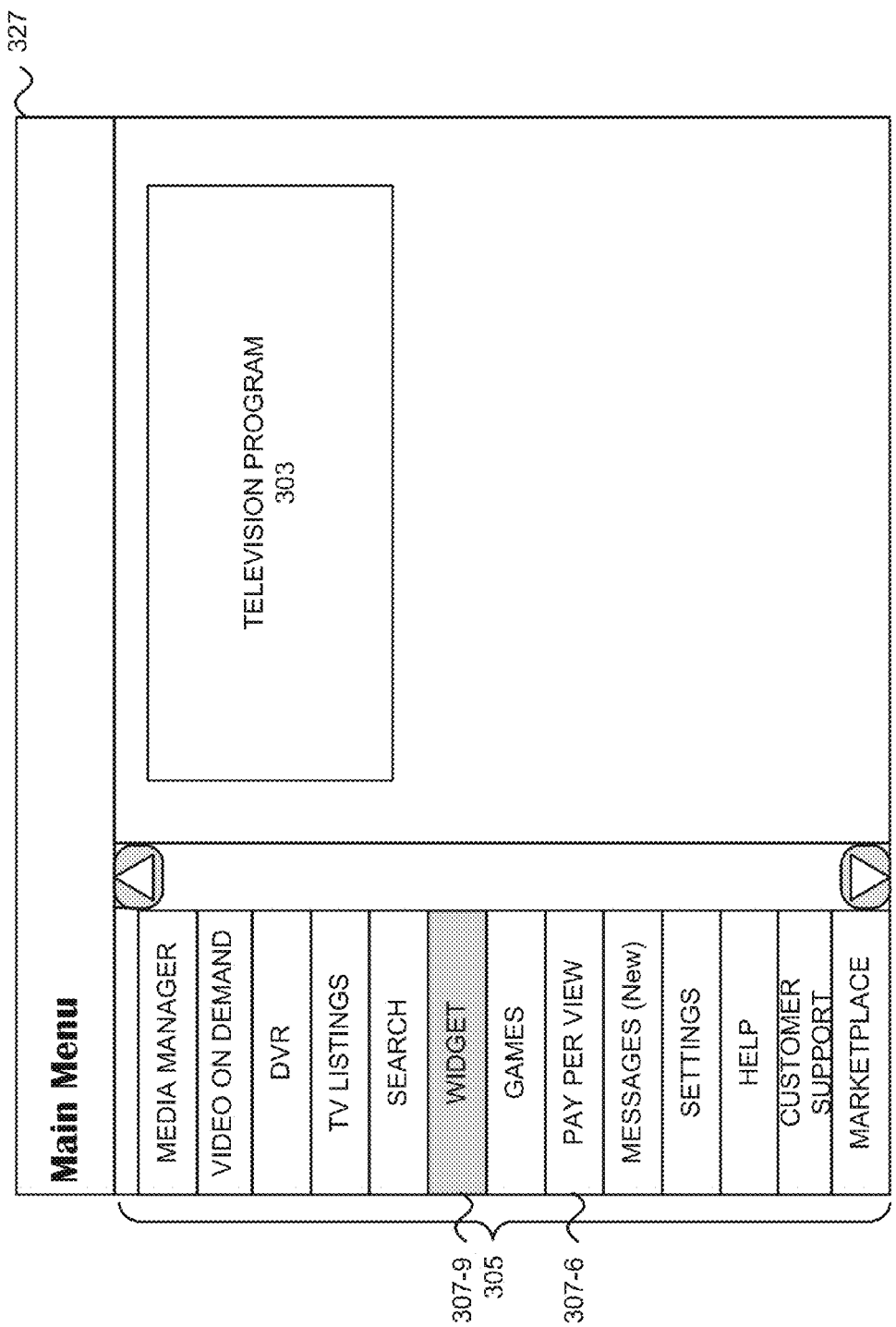

According to another example, referring to FIG. 3D, assume that based on the identified habitual navigational behavior, user interface agent 145 re-orders menu slots 307. For example, in user interface 327, menu-slot 307-9 is situated higher in the list of menu 305 relative to other menu slots (e.g., menu slot 307-6 named pay per view). In this way, the user may not have to scroll menu 305 or minimize the number of navigational inputs (e.g., minimize the use of arrow keys, etc.) in order to access menu slot 307 (named widgets).

The user interfaces may be implemented as files and stored on set top box 142. For example, a user interface file may have a format, such as Extensible Markup Language (XML), JavaScript Object Notation (JSON), delimiter separated values, or a spreadsheet file format (e.g., xls, csv, etc.). During the customization of a user interface, user interface agent 145 modifies a file. For example, user interface agent 145 calculates statements and/or other attributes of the data format that align with the usage pattern and/or other factors responsible for the modification, as described herein. As such, a modification to the file may include removing a statement, generating a statement, placing the statement in a particular location in the document (e.g., in a particular line), removing one statement and adding that statement to another file, etc. Set top box 142 may include a user interface rendering engine (not illustrated) that renders the customized user interface based on the (customized) stored file.

The auto-customized user interface service provides various customizations. For example, similar to the customization commands described below in relation to the self-customized user interface service, the auto-customized user interface service may include deleting, moving, resizing, swapping, adding, reshaping, etc. The customization of the user interface may be based on data other than the usage data, such as user preference data and personal data. For example, the age of the user may form the basis to resize or reshape a graphical element. By way of another example, color and font parameters may be customized based on the user preference data and/or personal data (e.g., age, gender, etc.). Additionally, as previously described, a pattern of usage may also be indicative of what the user does not want, need, etc. In this regard, the auto-customized user interface service may delete, move, swap, etc. a graphical element based on this information.

As previously described, the self-customized user interface service offers various customization commands to allow user 207 to customize a user interface displayed by television 144. Described below are exemplary customization commands that user 207 may invoke, however, other customization commands may be envisioned. Accordingly, the exemplary customization commands described are not intended to be exhaustive. For example, user interface agent 145 may allow user 207 to invoke a delete command, a swap command, a resize command, an add command, a move command, a rename command, a remove command, a reshape command, an assign a color command, an assign a font style command, an assign a font size command, a save command, a retrieve command, and an activate command.

A customization command may be applicable to a user interface, an element of a user interface (e.g., text, a button, a menu, an icon, an object, an interactive element, etc.), or both (also referred to as a graphical element). The delete command deletes a graphical element. The swap command exchanges the position between two graphical elements. According to an exemplary implementation, user 207 may be prompted, via a user interface of the self-customized user interface service, to select a first graphical element and a second graphical element. In this way, user 207 may swap graphical elements that are within a single user interface or reside in separate user interfaces. The resize command resizes a graphical element. For example, the resize command may be applied to an element of the user interface (e.g., a button, etc.). The add command adds a graphical element. The move command repositions a graphical element. The rename command labels a graphical element. For example, user 207 may enter text to name or rename a graphical element. The remove command removes a graphical element. The reshape command changes the shape of a graphical element. Typically, the reshape command may be applied to an element of the user interface (e.g., a button, etc.). The assign commands allow user 207 to assign a color, a font style, and a font size to a graphical element. The save command allows user 207 to save a customization. The retrieve command allows user 207 to retrieve a saved customized user interface. For example, user 207 may invoke the retrieve command to start a user interface customization session of a previously saved customized user interface. User 207 may then continue to review and/or further customize the retrieved user interface. Alternatively, user 207 may wish to invoke the activate command. For example, user 207 may invoke the activate command to indicate that the customized user interface is to be used as a user interface within the program service.

As previously mentioned, user interface agent 145 includes a user interface management system that stores, retrieves, and uses the appropriate user interfaces when providing the program service. The user interface management system may provide other commands and functions to user 207, such as to restore a pre-installed user interface, an undo command to undo one or multiple customization commands, etc.

Figure 2C:
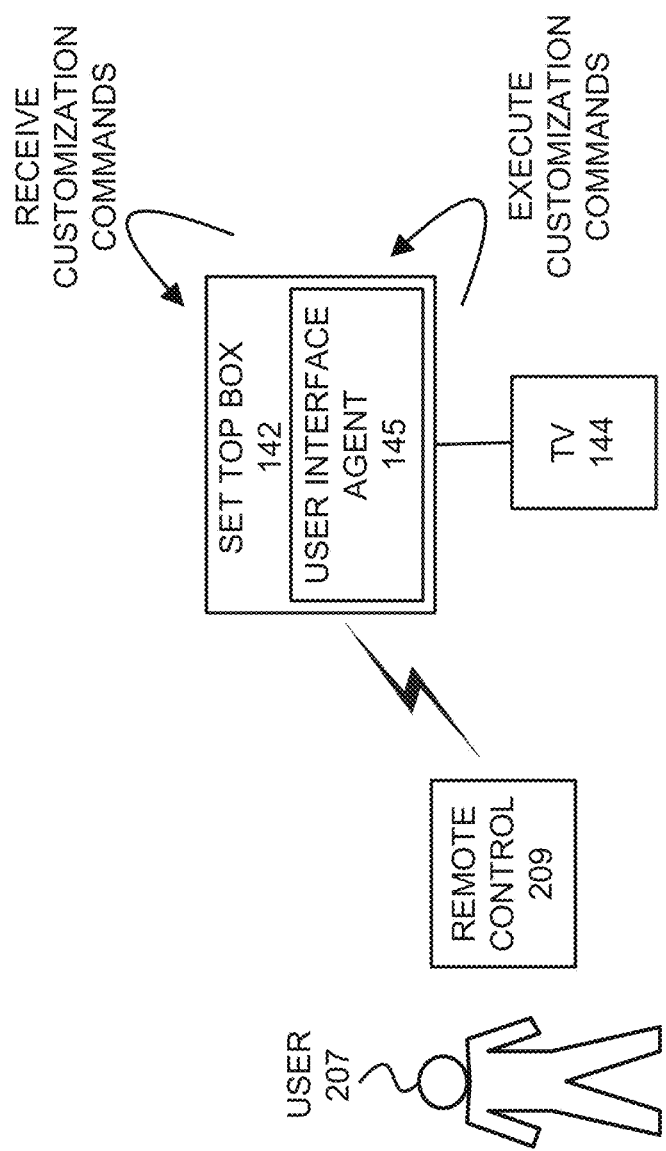
Figure 2D:
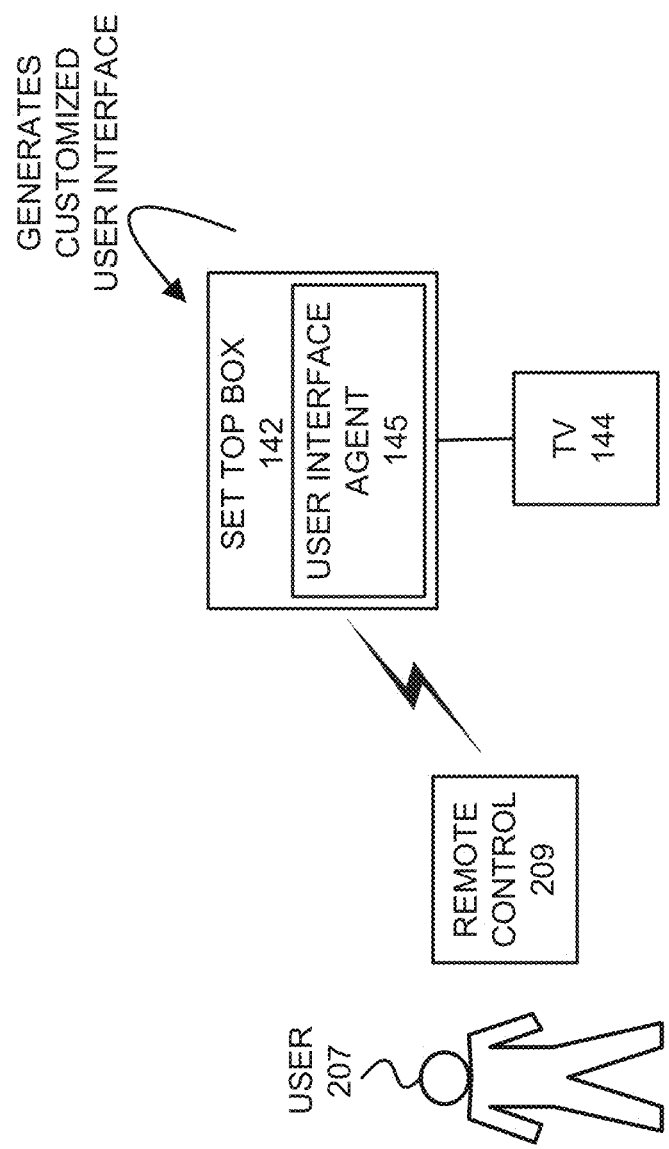
Figure 3E:
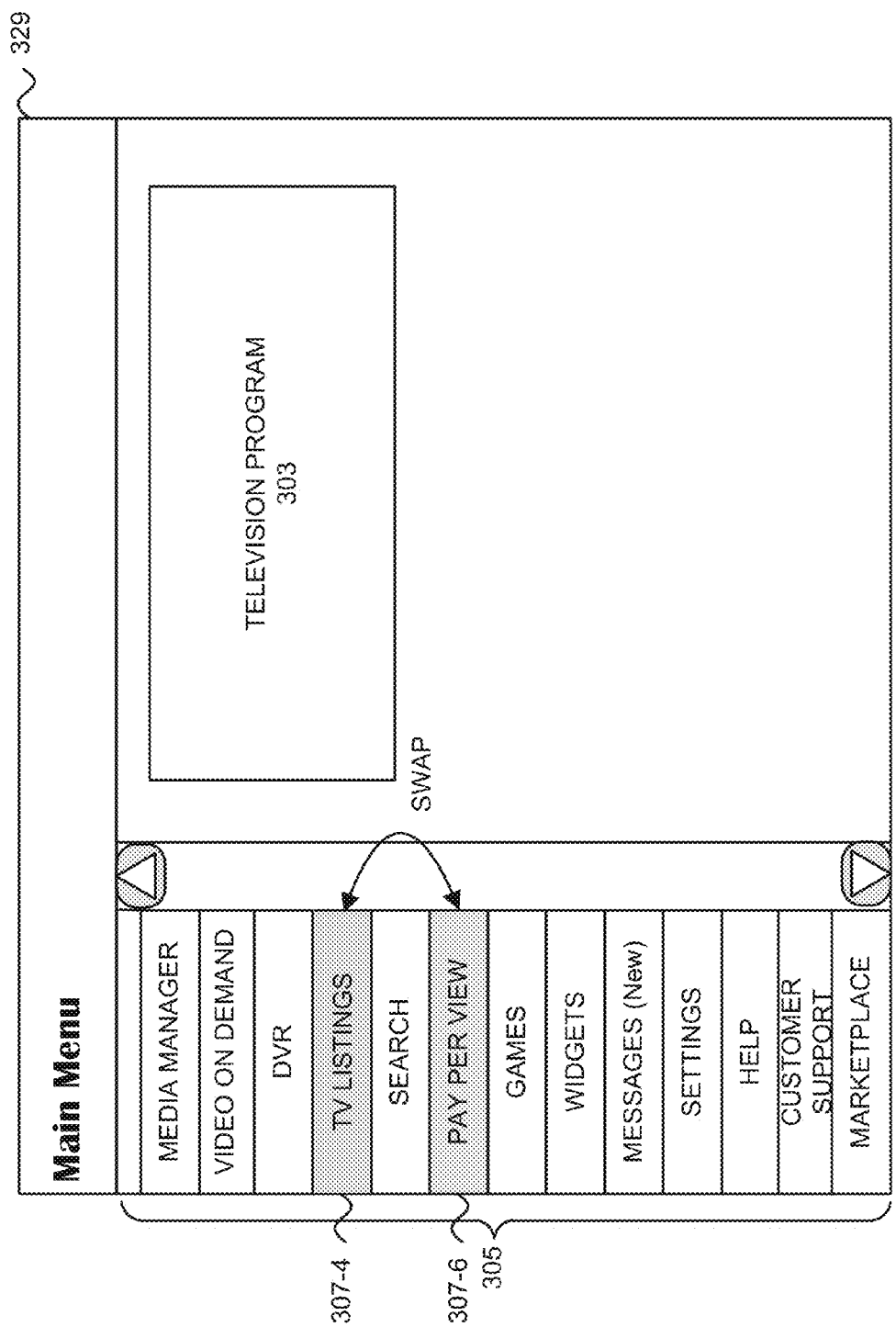
Figure 3F:
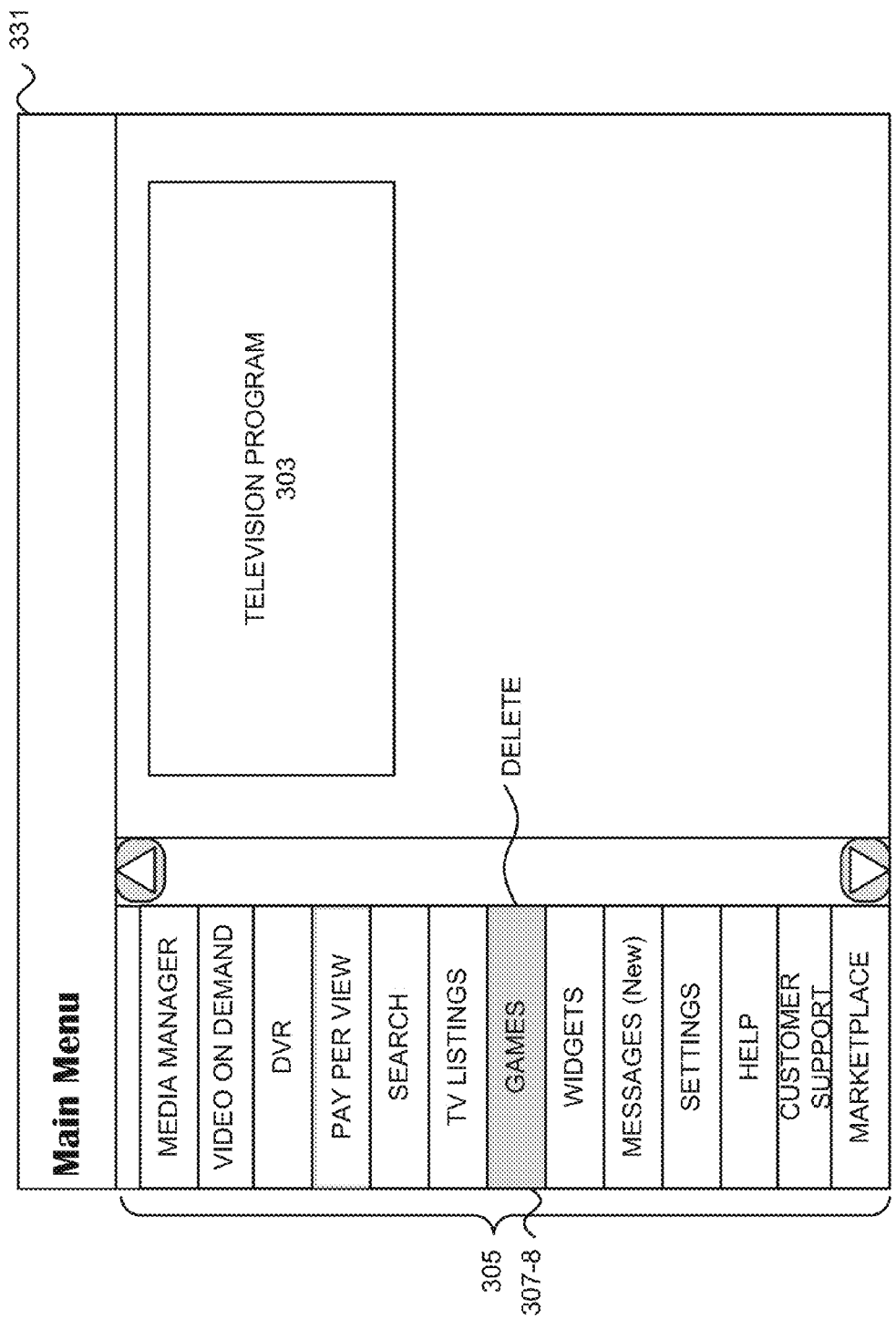

Referring to FIG. 2C, assume that user 207 invokes the self-customized user interface service by pressing a dedicated button of remote control 209 or selecting the service via a user interface displayed on television 144. Thereafter, user 207 navigates to a particular user interface and begins to self-customize the user interface by selecting customization commands. User interface agent 145 receives and executes the customization commands. As an example, referring to FIG. 3E, assume that user 207 selected the swap command which causes menu slots 307-4 and 307-6 to swap positions in menu 305 of a user interface 329. Referring to FIG. 3F, assume that user 207 selected the delete command to delete menu slot 307-8 in menu 305 of a user interface 331.

Figure 3G:
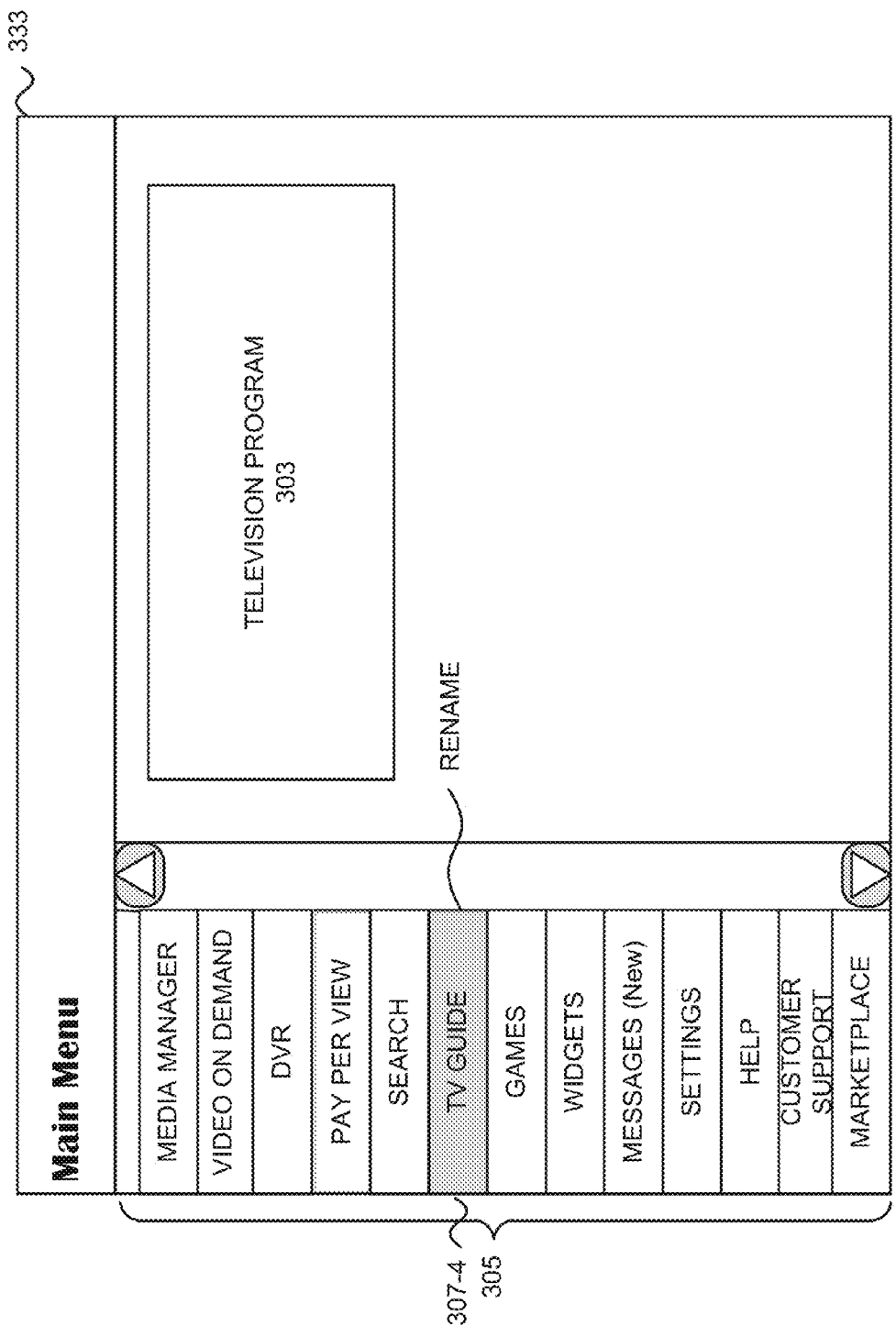
Figure 3H:
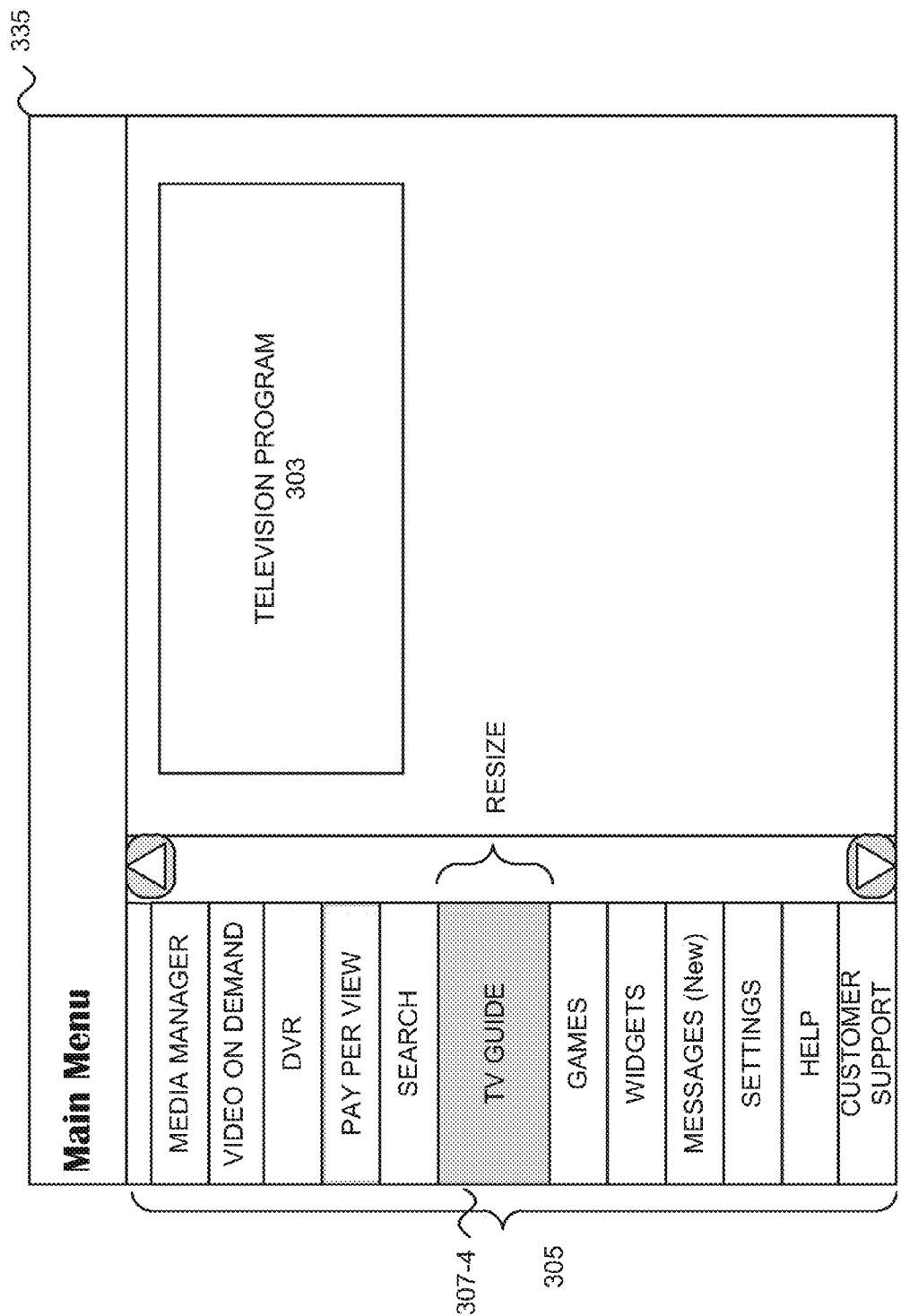

Referring to FIG. 3G and according to another exemplary use case, assume that user 207 selected the rename command to rename menu slot 307-4 in menu 305 of a user interface 333. For example, user 207 changes the name from "TV Listings" to "TV Guide." Referring to FIG. 3H and according to an exemplary use case, assume that user 207 selected the resize command that caused the size of menu slot 307-4 to expand in a user interface 335. According to an exemplary implementation, self-customized user interface service may allow user 207 to select from multiple sizes (e.g., pre-defined) when invoking the resize command that are allowable in view of the shell interface since there is a limited area available within user interface 335.

FIG. 4 is a diagram illustrating exemplary components of a device 400 that may correspond to one or more of the devices described herein. For example, device 400 may correspond to components included in user device 140 or other device(s) that may be used in the customized user interface service. As illustrated, device 400 includes a processor 405, a memory/storage 410 that stores software 415, a communication interface 420, an input 425, and an output 430. According to other implementations, device 400 may include fewer components, additional components, different components, and/or a different arrangement of components than those illustrated in FIG. 4 and described herein.

Processor 405 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 405 may be implemented as hardware (e.g., a microprocessor, etc.) or a combination of hardware and software (e.g., a SoC, an ASIC, etc.). Processor 405 may include one or multiple memories (e.g., memory/storage 410), etc.

Processor 405 may control the overall operation, or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., another device, a network, etc.).

Memory/storage 410 includes one or multiple memories and/or one or multiple other types of storage mediums. For example, memory/storage 410 may include one or multiple types of memories, such as, a random access memory (RAM), a dynamic random access memory (DRAM), a cache, a read only memory (ROM), a programmable read only memory (PROM), a static random access memory (SRAM), a single in-line memory module (SIMM), a dual in-line memory module (DIMM), a flash memory, and/or some other type of memory. Memory/storage 410 may include a hard disk (e.g., a magnetic disk, an optical disk, a magneto-optic disk, a solid state disk, etc.) and a corresponding drive. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 410 may store data, software, and/or instructions related to the operation of device 400

Software 415 includes an application or a program that provides a function and/or a process. Software 415 may include firmware. For example, with reference to user device 140, software 415 may include an application that, when executed by processor 405, provides the functions of user interface agent 145, as described herein. Additionally, with reference to network device 110, software 415 may include an application that, when executed by processor 405, provides the customized user interface service (e.g., customized user interface manager 123).

Communication interface 420 permits device 400 to communicate with other devices, networks, systems and/or the like. Communication interface 420 includes one or multiple wireless interface(s) and/or wired interface(s). For example, communication interface 420 may include one or multiple transmitter(s) and receiver(s), or transceiver(s).

Input 425 provides an input into device 400. For example, input 425 may include a keyboard, a keypad, a touchscreen, a touch pad, a touchless screen, a mouse, an input port, a button, a switch, a microphone, a knob, and/or some other type of input.

Output 430 provides an output from device 400. For example, output 430 may include a display, a speaker, a light (e.g., light emitting diode(s), etc.), an output port, a vibratory mechanism, and/or some other type of output.

Device 400 may perform a function or a process in response to processor 405 executing software instructions stored by memory/storage 410. For example, the software instructions may be read into memory/storage 410 from another memory/storage 410 or read from another device via communication interface 420. The software instructions stored in memory/storage 410 may cause processor 405 to perform processes described herein. Alternatively, according to another implementation, device 400 may perform a process or a function based on the execution of hardware (e.g., processor 405, etc.).

Figure 5:
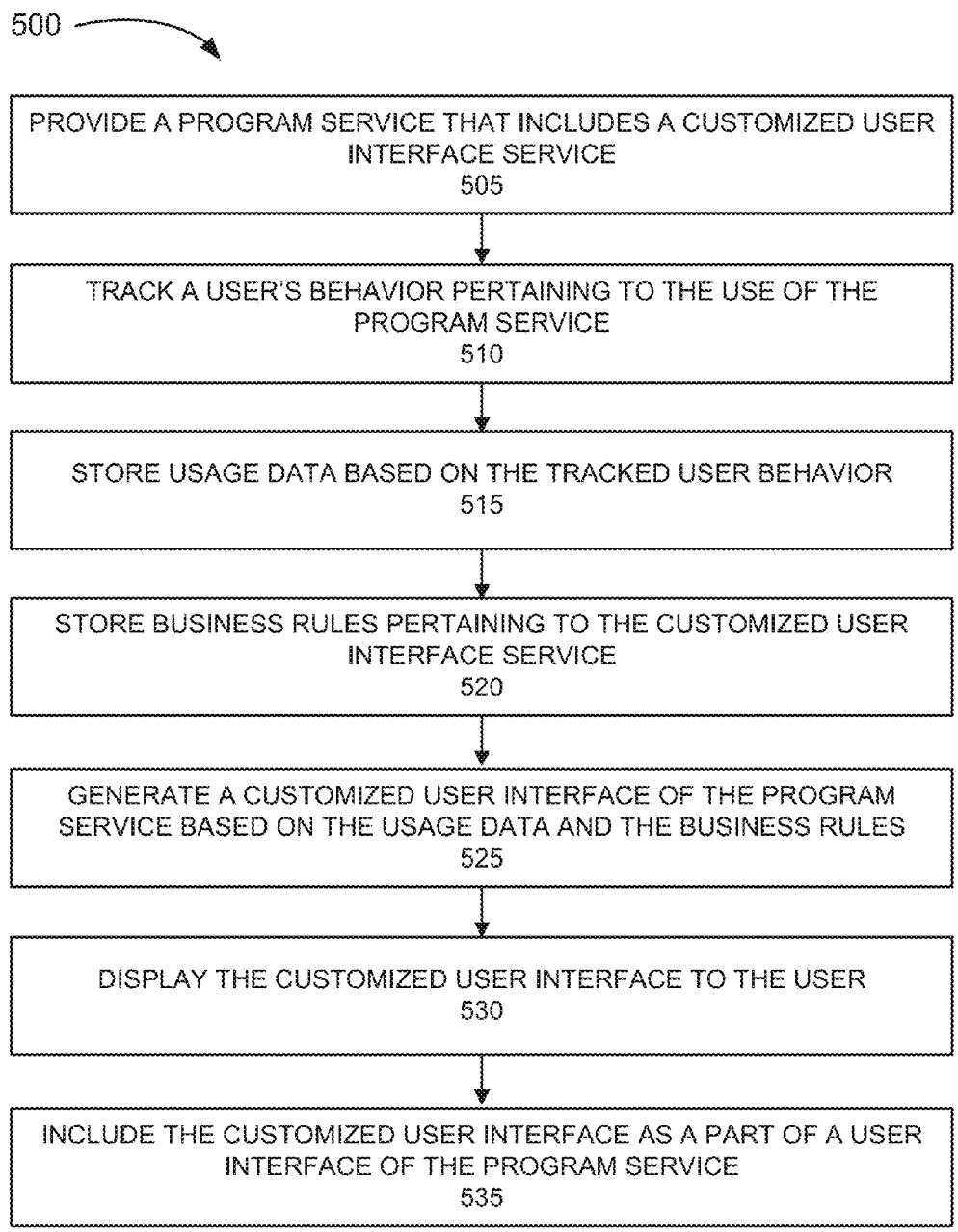
FIG. 5 is a flow diagram illustrating an exemplary process pertaining to the customized user interface service.

FIG. 5 is a flow diagram illustrating an exemplary process pertaining to the customized user interface service. Process 500 is directed to the embodiment of an auto-customized user interface service. According to an exemplary embodiment, one or more operations of process 500 are performed user interface agent 145, customized user interface manager 123, or both. For example, the functionality of user interface agent 145 may be implemented by processor 405 executing software 415. Similarly, the functionality of customized user interface manager 123 may be implemented by processor 405 executing software 415.

Referring to FIG. 5, in block 505, a program service that includes a customized user interface service is provided. For example, as previously described, network 105 provides a program service to users via user devices 140. The program service includes the customized user interface service.

In block 510, a user's behavior pertaining to the use of the program service is tracked. For example, as previously described, user interface agent 145 of user device 140 tracks the user's use of the program service. By way of further example, user interface agent 145 records the navigational inputs of the user. The user's use of the program service includes the user's navigational behavior via user interfaces provided, the programs viewed by the user, or both. Additionally, or alternatively, the user's behavior may be tracked at the network side by, for example, web server 122, VSO 114, and/or other network devices 110.

In block 515, usage data based on the tracked user behavior is stored. For example, as previously described, user interface agent 145 stores usage data pertaining to the user's behavior. Additionally, or alternatively, the usage data may be stored at the network side by, for example, data storage manager 128 of customized user interface manager 123. According to an exemplary implementation, customized user interface manager 123 may obtain usage data from other network devices 110 that track the user's behavior. Additionally, as previously described, user preference data may be stored.

In block 520, business rules pertaining to the customized user interface service are stored. For example, as previously described, user interface agent 145 stores business rules pertaining to the customized user interface service. Additionally, or alternatively, the business rules may be stored at the network side by, for example, data storage manager 128.

In block 525, a customized user interface of the program service is generated based on the usage data and the business rules. For example, user interface agent 145 analyzes the usage data to identify a pattern of usage. By way of example, as previously described in relation to FIG. 3C, user interface agent 145 identifies that the user habitually accesses a Facebook widget via a main menu. Additionally, user interface agent 145 uses the business rules that indicate threshold values (e.g., a minimum period of time, a minimum number of usages of the user interface(s)) that allow user interface agent 145 to determine that a usage pattern exists. In response to these identifications, user interface agent 145 generates a customized user interface. For example, the customization of the user interface may include moving a graphical element of a user interface to position that is more accessible to the user. By way of further example, a graphical element of a list may be moved to a position higher or a graphical element may be moved from a lower layer user interface to a high layer user interface. According to other exemplary user cases, user interface agent 145 may perform other types of customizations (e.g., deletion of a graphical element), as previously described. Alternatively, as previously described, user interface generator 124 may generate the customized user interface.

In block 530, the customized user interface is displayed to the user. For example, as previously described, user device 140 displays the customized user interface to the user. The customized user interface service allows the user to accept or refuse the customized user interface. For example, a user interface may be displayed to allow the user to indicate the user's acceptance or refusal of the customized user interface or other suitable method (e.g., pressing a button, etc.). The user may indicate to accept or refuse the customized user interface via remote control 209 or mobile device 148.

In block 535, the customized user interface is included as a part of a user interface of the program service. For example, assume that the user accepts the customized user interface. User interface agent 145 incorporates the customized user interface into the user interfaces provided to the user via the program service. For example, the customized user interface corresponds to a new main menu screen. User interface agent 145 stores the customized user interface. User interface agent 145 retrieves the customized user interface as the main menu screen when the user invokes the main menu screen.

According to an exemplary embodiment, if for example, the user refuses the customized user interface, user interface agent 145 may delete the customized user interface. Additionally, user interface agent 145 may provide various prompts to the user, via a user interface, to allow the user to indicate a reason for the refusal. By way of example, a customization of a user interface may be implemented multiple ways, such as leaving a graphical element on the same user interface but placing the graphical element in a different area or position, moving the graphical element from a sub-user interface to a higher layer user interface, etc. Thus, the user may prefer one way over another. User interface agent 145 may obtain this information from the user and re-customize the user interface to the user's preference. Alternatively, the user may indicate via the user preference data, this type of user preference, which in turn, user interface agent 145 may use when generating the customized user interface.

Although FIG. 5 illustrates an exemplary process 500, according to other implementations, process 500 may include additional operations, fewer operations, and/or different operations than those illustrated in FIG. 5, and described herein. For example, process 500 may include assigning the customized user interface to a particular input of user device 140 or a peripheral device (e.g., remote control 209). For example, the input may be implemented as a button (e.g., a soft button of a user interface or a hard button (i.e., a physical button of a keypad of user device 140, a button of remote control 209, etc.)). As an example, user interface agent 145 may prompt the user as to whether the user would like to assign the customized user interface to a hot key.

Figure 6:
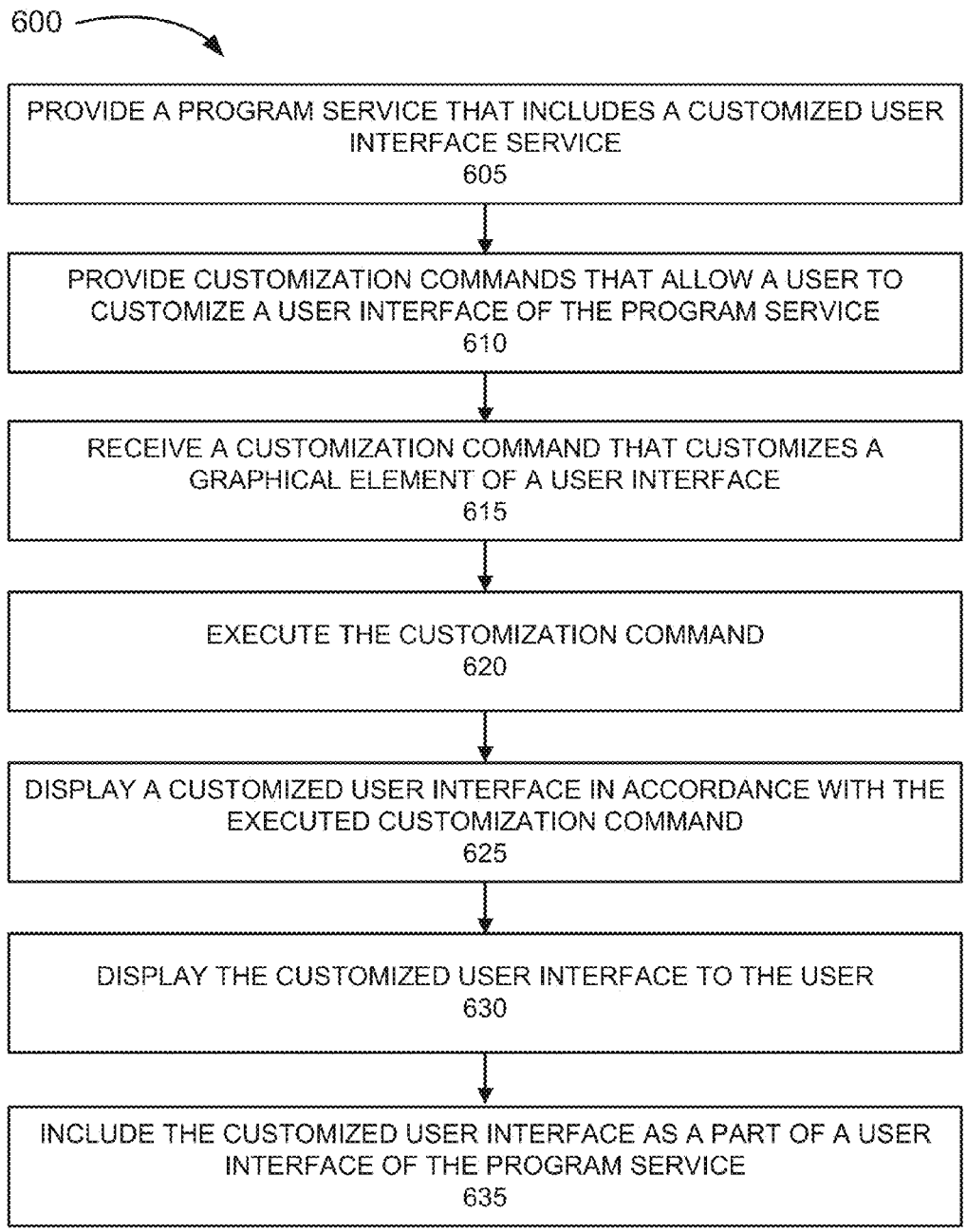
FIG. 6 is a flow diagram illustrating another exemplary process pertaining to the customized user interface service.

FIG. 6 is a flow diagram illustrating another exemplary process pertaining to the customized user interface service. Process 600 is directed to the embodiment of a self-customized user interface service. According to an exemplary embodiment, one or more operations of process 600 are performed user interface agent 145, customized user interface manager 123, or both. For example, the functionality of user interface agent 145 may be implemented by processor 405 executing software 415. Similarly, the functionality of customized user interface manager 123 may be implemented by processor 405 executing software 415.

Referring to FIG. 6, in block 605, a program service that includes a customized user interface service is provided. For example, as previously described, network 105 provides a program service to users via user devices 140. The program service includes the customized user interface service.

In block 610, customization commands that allow a user to customize a user interface of the program service are provided. For example, as previously described, user interface agent 145 allows the user to invoke a delete command, a swap command, a resize command, an add command, a move command, a rename command, a remove command, a reshape command, an assign a color command, an assign a font style command, an assign a font size command, a save command, a retrieve command, and an activate command.

In block 615, a customization command that customizes a graphical element of a user interface is received. For example, as previously described, the user may invoke a customization command via user interface agent 145 in relation to a user interface that is displayed via user device 140 (e.g., a mobile phone, a television, etc.).

In block 620, the customization command is executed. For example, as previously described, user interface agent 145 executes the customization command.

In block 625, a customized user interface in accordance with the executed customization command. For example, as previously described, as a result of the execution of the customization command, user interface agent 145 generates a customized user interface.

In block 630, the customized user interface is displayed to the user. For example, as previously described, user device 140 displays the customized user interface to the user. The customized user interface service allows the user to accept or refuse the customized user interface. For example, a user interface may be displayed to allow the user to indicate the user's acceptance or refusal of the customized user interface or other suitable method (e.g., pressing a button, etc.). The user may indicate to accept or refuse the customized user interface via remote control 209 or mobile device 148.

In block 635, the customized user interface is included as a part of a user interface of the program service. For example, assume that the user accepts the customized user interface. User interface agent 145 incorporates the customized user interface into the user interfaces provided to the user via the program service. For example, the customized user interface corresponds to a new main menu screen. User interface agent 145 stores the customized user interface. User interface agent 145 retrieves the customized user interface as the main menu screen when the user invokes the main menu screen.

Although FIG. 6 illustrates an exemplary process 600, according to other implementations, process 600 may include additional operations, fewer operations, and/or different operations than those illustrated in FIG. 6, and described herein.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 5 and 6, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 405, etc.), or a combination of hardware and software (e.g., software 415). The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, operation, or instruction described in the present application should be construed as critical or essential to the embodiments described herein unless explicitly described as such.

What is claimed is:

1. A method comprising:
    providing, via a device and to a user, a program service that includes a customized user interface service;
    tracking, by the device, the user's behavior pertaining to a use of the program service;
    storing, by the device, usage data based on the user's behavior, wherein the usage data includes navigational data that indicates a navigational history of the user's use of original user interfaces of the program service;
    storing, by the device, business rules pertaining to the customized user interface service, wherein the business rules include a first rule for all users that prevents a removal of a particular function and a service associated with the original user interfaces, a second rule for all users that restricts, but does not prevent, a particular type of customization of the original user interfaces, and a third rule that pertains to the tracking of the user's behavior;
    generating, by the device, a customized user interface based on the business rules and the usage data, wherein the customized user interface includes an alteration of one or more graphical elements of one or more user interfaces of the original user interfaces of the program service;
    displaying, via the device, the customized user interface to the user; and
    including the customized user interface as a part of the original user interfaces of the program service.

2. The method of claim 1, further comprising:
    identifying a pattern of usage based on the usage data, and wherein the generating comprises:
    moving, based on the identifying, at least one of the one or more graphical elements to another position in at least one of the one or more user interfaces.

3. The method of claim 1, further comprising:
    identifying a pattern of usage based on the usage data; and
    identifying a pattern of non-use based on the pattern of usage, and wherein the generating comprises:
    deleting, based on the identifying of the pattern of non-use, at least one of the one or more graphical elements from at least one of the one or more user interfaces.

4. The method of claim 1, wherein the third rule of the business rules indicate at least one of a minimum period of time to have elapsed before a pattern of usage of the original user interfaces, which is attributable to the user, can be identified, or a minimum number of usages of the original user interfaces to have taken place before the pattern of usage, which is attributable to the user, can be identified.

5. The method of claim 1, further comprising:
    tracking a group of users behavior pertaining to the program service;
    identifying a usage pattern pertaining to the group of users;
    generating another customized user interface based on the usage pattern pertaining to the group of the users; and
    offering to the users an option to incorporate the other customized user interface as the part of the original user interfaces of the program service.

6. The method of claim 1, wherein the usage data includes viewing data that indicates programs viewed by the user, and the method further comprising:
    storing user preference data that indicates the user's preferences pertaining to the customized user interface service; and
    generating the customized user interface based on the business rules, the usage data, and the user preference data.

7. A device comprising:
    a communication interface;
    a memory, the memory stores instructions; and
    a processor, the processor executes the instructions to:
    provide a program service that includes a customized user interface service to a user;
    track the user's behavior pertaining to a use of the program service;
    store usage data based on the user's behavior, wherein the usage data includes navigational data that indicates a navigational history of the user's use of original user interfaces of the program service;
    store business rules pertaining to the customized user interface service, wherein the business rules include a first rule for all users that prevents a removal of a particular function and a service associated with the original user interfaces, a second rule for all users that restricts, but does not prevent, a particular type of customization of the original user interfaces, and a third rule that pertains to a tracking of the user's behavior;
    generate a customized user interface based on the business rules and the usage data, wherein the customized user interface includes an alteration of one or more graphical elements of one or more user interfaces of the original user interfaces of the program service;
    display or cause to display the customized user interface; and
    include the customized user interface as a part of the original user interfaces of the program service.

8. The device of claim 7, wherein the device includes a set top box, and wherein the processor executes the instructions to:
    provide categories of customizations of the original user interfaces, wherein the categories include age, locale, user personality, and most-popular among the users;

receive a selection, from the user, of one of the categories of customizations; and
store the selection of the one of the categories of customizations as a user preference.

9. The device of claim 7, wherein the processor executes the instructions to:
identify a pattern of usage based on the usage data, and wherein, when generating the customized user interface, the processor executes the instructions to:
modify, based on the identification of the pattern of usage, at least one of the one or more graphical elements of at least one of the one or more user interfaces.

10. The device of claim 7, wherein the processor executes the instructions to:
identify a pattern of usage based on the usage data; and
identify a pattern of non-use based on the pattern of usage, and wherein, when generating the customized user interface, the processor executes the instructions to:
delete, based on the identification of the pattern of non-use, at least one of the one or more graphical elements from at least one of the one or more user interfaces.

11. The device of claim 7, wherein, when generating the customized user interface, the processor executes the instructions to:
execute one or more of a delete, a swap, a resize, an add, a move, a rename, or a remove in relation to at least one of the one or more graphical elements from at least one of the one or more user interfaces.

12. The device of claim 7, wherein the usage data includes viewing data that indicates programs viewed by the user, wherein the processor executes the instructions to:
store user preference data that indicates the user's preferences pertaining to the customized user interface service; and
generate the customized user interface based on the business rules, the usage data, and the user preference data.

13. The device of claim 7, wherein the processor executes the instructions to:
receive a selection of a hot key; and
assign the customized user interface to the hot key.

14. The device of claim 7, wherein the processor executes the instructions to:
display or cause to display a graphical user interface that prompts the user to confirm the user's acceptance of the customized user interface;
receive, via the communication interface, a user input pertaining to the graphical user interface; and
identify whether the user input indicates an acceptance of the customized user interface, and wherein, when including, the processor executes the instructions to:
include the customized user interface as a part of the original user interfaces of the program service in response to an identification that the user input indicates the acceptance of the customized user interface.

15. The device of claim 7, wherein the processor executes the instructions to:
provide customization commands, for user selection, that are executable on the customized user interface or another one of the user interfaces of the program service, wherein the customization commands include a delete command, a swap command, a resize command, an add command, a move command, a rename command, a remove command, a reshape command, an assign a color command, an assign a font style command, and an assign a font size command;
receive, via the communication interface, a user selection of one or more of the customization commands;
execute the one or more customization commands; and
generate, as a result of the execution of the one or more customization commands, another customized user interface.

16. A non-transitory storage medium storing instructions executable by a computational device, wherein the instructions comprise instructions to:
track a user's behavior pertaining to a use of a program service that includes a customized user interface service;
store usage data based on the user's behavior, wherein the usage data includes navigational data that indicates a navigational history of the user's use of original user interfaces of the program service;
store business rules pertaining to the customized user interface service, wherein the business rules include a first rule for all users that prevents a removal of a particular function and a service associated with the original user interfaces, a second rule for all users that restricts, but does not prevent, a particular type of customization of the original user interfaces, and a third rule that pertains to a tracking of the user's behavior; and
generate a customized user interface based on the business rules and the usage data, wherein the customized user interface includes an alteration of one or more graphical elements of one or more user interfaces of the original user interfaces of the program service.

17. The non-transitory storage medium of claim 16, further comprising instructions to:
analyze the usage data; and
identify a pattern of usage based on the analysis of the usage data.

18. The non-transitory storage medium of claim 16, further comprising instructions to:
receive an input from the user that edits the customized user interface; and
generate another customized user interface based on the input.

19. The non-transitory storage medium of claim 16, further comprising instructions to:
receive a selection of a hot key; and
assign the customized user interface to the hot key.

20. The non-transitory storage medium of claim 16, further comprising instructions to:
identify the user;
store user preference data that indicates the user's preferences pertaining to the customized user interface service;
store personal data that indicates demographics pertaining to the user; and
generate the customized user interface based on the business rules, the usage data, the user preference data, and the personal data.

* * * * *